US009592543B2

(12) United States Patent
Elkins

(10) Patent No.: US 9,592,543 B2
(45) Date of Patent: Mar. 14, 2017

(54) PORTABLE GAS MONITOR

(75) Inventor: Charles Elkins, Medina, OH (US)

(73) Assignee: Elkins Earthworks, LLC, Medina, OH (US)

(*) Notice: Subject to any disclaimer, the term of this patent is extended or adjusted under 35 U.S.C. 154(b) by 180 days.

(21) Appl. No.: 13/567,176

(22) Filed: Aug. 6, 2012

(65) Prior Publication Data
US 2012/0297868 A1 Nov. 29, 2012

Related U.S. Application Data

(63) Continuation of application No. 13/104,274, filed on May 10, 2011, now abandoned, which is a continuation-in-part of application No. 11/634,186, filed on Dec. 5, 2006, now Pat. No. 8,168,121.

(60) Provisional application No. 61/453,655, filed on Mar. 17, 2011.

(51) Int. Cl.
E21B 47/00 (2012.01)
B09B 1/00 (2006.01)

(52) U.S. Cl.
CPC .............. B09B 1/00 (2013.01); E21B 47/00 (2013.01)

(58) Field of Classification Search
CPC .................... E21B 47/00; B09B 1/00
USPC ......... 422/83, 94; 702/2, 6, 23, 24; 700/266; 405/129.1–129.95; 73/152.01, 152.18, 73/152.42
See application file for complete search history.

(56) References Cited

U.S. PATENT DOCUMENTS

| 5,063,519 | A | 11/1991 | Zison |
| 5,616,841 | A | 4/1997 | Brookshire |
| 6,085,576 | A * | 7/2000 | Sunshine et al. ............ 73/29.01 |
| 6,169,962 | B1 | 1/2001 | Brookshire |
| 6,356,205 | B1 * | 3/2002 | Salvo et al. ............... 340/853.3 |
| 6,579,231 | B1 * | 6/2003 | Phipps .......................... 600/300 |
| 6,658,915 | B2 * | 12/2003 | Sunshine et al. ............. 73/23.2 |
| 6,999,883 | B1 | 2/2006 | Brady |
| 2001/0005812 | A1 * | 6/2001 | Brookshire et al. .............. 702/6 |
| 2001/0039824 | A1 * | 11/2001 | Sunshine et al. ............ 73/29.01 |
| 2003/0206834 | A1 | 11/2003 | Chiao et al. |
| 2004/0083797 | A1 * | 5/2004 | Ward et al. .................... 73/40.7 |
| 2004/0170409 | A1 | 9/2004 | Faries et al. |
| 2004/0267340 | A1 | 12/2004 | Cioanta et al. |
| 2005/0061056 | A1 | 3/2005 | Sunshine et al. |
| 2005/0120775 | A1 * | 6/2005 | Grayfer et al. .............. 73/28.04 |
| 2005/0236042 | A1 | 10/2005 | Hansen |

(Continued)

FOREIGN PATENT DOCUMENTS

| EP | 1217420 | 6/2002 |
| GB | 2273593 | 6/1994 |
| WO | 9311421 | 6/1993 |

OTHER PUBLICATIONS

LANDTEC, GEM-500 Operation Manual (2003).

(Continued)

Primary Examiner — Shogo Sasaki
(74) Attorney, Agent, or Firm — Fay Sharpe, LLP

(57) ABSTRACT

A portable monitor used to measure landfill gas and landfill well parameters. The portable monitor includes a control unit and a measuring unit that can communicate wirelessly with one another. The control unit and/or measuring unit can include a heating arrangement to increase the temperature of one or more components in the control unit and/or measuring unit in cold environments.

51 Claims, 5 Drawing Sheets

(56) References Cited

U.S. PATENT DOCUMENTS

| | | |
|---|---|---|
| 2006/0034664 A1 | 2/2006 | Augenstein et al. |
| 2009/0133479 A1* | 5/2009 | Haberland .................. 73/64.48 |
| 2010/0057401 A1* | 3/2010 | Scheffler et al. ............. 702/182 |
| 2011/0096332 A1* | 4/2011 | Bugge .......................... 356/477 |

OTHER PUBLICATIONS

LANDTEC, SEM-500 Surface Emission Monitor Operation, Configuration, and Maintenance Guide (1993).
LANTEC, GEM 2000 Gas Analyzer & Extraction Monitor Operation Manual (2003).
Trimble Navigation Limited, Datasheet, Recon Handheld (2006).
LANDTEC, The CES-LANDTEC Field Server Unit is the centerpiece for the DataField Scalable Environmental Information Management System (2004).
LANDTEC, GEM 2000 Plus Gas Analyzer (2006).
LANDTEC, GEM 500 Portable Gas Analyzer (2003).
LANDTEC, SEM 500 Users Guide (1999).
LANDTEC, "The GEM 2000 combines the GEM 500 and the GA-90 into one faster, more accurate, intrinsically safe instrument" (2003).
European Search Authority, Extended European Search Report in corresponding application (Aug. 20, 2015).

* cited by examiner

PORTABLE GAS MONITOR

The present patent application is a continuation of U.S. patent application Ser. No. 13/104,274 filed May 10, 2011, now abandoned, which in turn is a continuation-in-part of U.S. patent application Ser. No. 11/634,186 filed Dec. 5, 2006, now U.S. Pat. No. 8,168,121, which is incorporated herein by reference.

The present patent application is a continuation of U.S. patent application Ser. No. 13/104,274 filed May 10, 2011, now abandoned, which claims priority on U.S. Provisional Application Ser. No. 61/453,655 filed Mar. 17, 2011, which is incorporated herein by reference.

The present invention is directed to portable fluid monitoring systems, particularly to a portable fluid monitoring system used to measure fluid pressure and/or fluid composition, and even more particularly to a portable gas monitoring system used to measure gas pressures and compositions of gasses at a plurality of different wells that are located in a location remote from one another. The portable fluid monitor is particularly useful in measuring gas pressures and compositions of gasses from landfill wells; however, the portable fluid monitor can be used for other or additional applications.

BACKGROUND OF THE INVENTION

Landfills are commonly formed by depositing municipal solid waste and many other types of trash in a canyon or pit (or even on flat ground) and depositing soil on top of the solid waste and trash. It is common for there to be alternating layers of trash and soil, one atop another in the landfill. The waste and soil layers are individually and collectively porous media through which gas may readily flow. Once municipal waste is disposed of at a landfill, the organic portion of the waste begins to decompose. This decomposition initially proceeds through an aerobic biodegradation process wherein much of the available oxygen in the buried waste is consumed. This decomposition produces end products which are primarily carbon dioxide and water. After a while, usually ranging from a few weeks to several months, the waste consumes essentially all the free oxygen in the landfill. The decomposition of the waste then proceeds through an anaerobic biodegradation process. During the anaerobic decomposition of the waste, microbes break down the cellulose and other organic wastes to produce methane ($CH_4$) and carbon dioxide ($CO_2$). The landfill gas (LFG) that is formed typically includes about 55% methane, 44% carbon dioxide and less than 1% trace gas. The trace gases consist of a wide variety of volatile compounds, which vary depending on the particular landfill.

As anaerobic gas production proceeds, the methane and carbon dioxide concentration in the landfill increases. The mixture of methane and carbon dioxide eventually begins to migrate within the landfill toward the surface of the landfill and into the atmosphere. Surface emissions of landfill gas are not desirable since the primary constituents of the landfill gas are known green house gases. In addition, the trace gases in the landfill gas can also lead to the formation of ozone, and/or result in undesirable odors. Furthermore, the landfill gas may migrate laterally in the subsurface of the landfill and accumulate in nearby buildings or other structures, thereby creating potentially dangerous conditions due to the methane content of landfill gas. Also, the landfill gas may move to regions containing ground water, thereby potentially resulting in the contamination of the ground water. As such, it is desirable to collect landfill gas to prevent these negative environmental effects. Also, it is desirable to collect landfill gas for energy recovery purposes since the methane content of landfill gas can be used as a source of fuel.

Landfill gas well extraction systems are commonly used to control landfill gas surface emissions, control landfill gas subsurface migration away from the landfill, and often to collect landfill gas for energy recovery. These extraction systems typically include one or more vertical and/or horizontal landfill gas extraction wells that are in fluid communication with one or more header piping systems. The header piping system is, in turn, fluidly connected to a vacuum source (e.g., centrifugal blower, etc.).

When the methane concentration is relatively high and nitrogen is relatively low in the landfill gas, for example, little or no air may be penetrating the landfill, thus the extraction rate of the landfill gas can be increased. When the extracted landfill gas is nitrogen rich and methane poor, and/or when oxygen is in the landfill gas, or when the molecular ratio of carbon dioxide to methane is high signaling substantial amounts of aerobic decomposition, the extraction rate of the landfill gas is reduced.

The process of controlling flow of the landfill gas into the landfill ell is known as "tuning." Various techniques have been used to "tune" the flowrate of landfill gas into the well. One technique is to adjust the wellhead valve position. If the wellhead valve position is not calibrated for a given flow rate, this method of operation is not very reliable. The position of the valve handle typically does not provide sufficient information about the well to control it. Another technique is to control the flowrate by controlling the wellhead vacuum. This technique relies on the relationship of well pressure/vacuum to flow for a given well. Reliance upon this method of operation is difficult since the relationship between flow and pressure is difficult to affect while performing day-to-day well field adjustments. As decomposition, moisture, and other conditions change, this method can also become unreliable.

Another technique is to control the flowrate by using a fixed or portable flow measurement device at each wellhead to obtain data needed to calculate volumetric (or mass) flow rates of the landfill gas being extracted from the landfill. This method of control is the most accurate and reliable of the various techniques used to control landfill gas flowrate into the well. The measurements can also be used to monitor the quantity of methane extracted (Landfill gas flowrate times percent methane in landfill gas) and/or the quantity of BTUs recovered per hour (landfill gas flowrate times percent methane in landfill gas times BTUs per cubic foot of methane times 60 minutes per hour). Measuring the flowrate of landfill gas from the landfill is an essential part of monitoring and adjusting a well in a landfill. The well should be adjusted until the amount of methane recovered is maximized for the long term. A greater amount of methane or energy can usually be recovered over the short term; however, this ultimately leads to diminishing returns. This is seen in stages as increased carbon dioxide and gas temperature, and later as increased oxygen from well over-pull. In time, the methane content in the landfill gas will decline, resulting in a portion of the landfill, usually at the surface, being driven aerobic. The frequency of landfill well monitoring can vary. Normal monitoring frequency for a complete field monitoring session with full field readings will vary from typically once a month to once a week. Well field monitoring should not normally be extended beyond one month. Typical field readings for each well includes a) name of field tester, b) location of landfill well, c) date/time of readings of landfill well, d) landfill gas composition (e.g., methane, oxygen, carbon dioxide, nitrogen, etc.), e) wellhead gas temperature, f) ambient air temperature, g) static pressure of wellhead, h) applied vacuum pressure in wellhead, i) wellhead gas flow, j) wellhead adjustment valve position, k) new wellhead vacuum and flow information after any flowrate adjustment, l) calculation of landfill gas flowrate and methane flowrate; and m) comments and/or notes regarding well, landfill, testing procedure, etc. Other types of gasses in the landfill gas may be tested (e.g., carbon monoxide, hydrogen sulphide, etc.) if problems are suspected in the landfill.

A portable gas monitor is commonly used to "tune" landfill gas flowrate into the well. The equipment cost, equipment maintenance, and personnel costs for constantly monitoring a gas well is generally too expensive and unnecessary to properly monitor a landfill well. The composition of the extracted landfill gas and the pressure in the well is measured periodically (e.g., daily, weekly, monthly, etc.). Generally, a landfill well is monitored every month, three months, six months or twelve months depending on the size of the well, the location of the well and the gas volume flowing from the well. One type of prior art portable gas monitor currently used is a monitor offered by Landtec, a division of CES, Inc. Landtec currently offers several models of portable gas monitors, namely SEM-500, GEM 500, GEM 2000 and GEM 2000 PLUS. These portable monitors are carried to a landfill or landfill well, temporarily connected to the landfill well, measure information from the connected landfill well, disconnected from the landfill well, carried to another landfill well on a same or different landfill, temporarily connected to the new landfill well, measure information from the connected to new landfill well, disconnected from the new landfill well, etc. This process is repeated for each different landfill being measured by the portable monitor. These portable monitors are designed to only monitor and measure one landfill well at a time. These devices can be used to measure the landfill gas composition being drawn from the landfill well, the temperature of the landfill gas, and the vacuum being drawn on the landfill, etc. The testing procedure at each well can take about 3-60 minutes, depending on the type of well and number of measurements taken from the well. These readings are then used to "tune" the flowrate of landfill gas being drawn from the landfill. After the desired readings are obtained, the portable gas monitor is disconnected from the landfill well and then subsequently reconnected to a different landfill well to obtain readings from such different landfill well.

Although these portable monitors enable the testing of wells, these portable monitors have several drawbacks. During the fall, winter and springs months, the outside temperature can drop to below 40° F. in various regions of the world. Operation of these prior art portable monitors can begins to slow down in colder temperatures, and in some situations, the portable monitor w malfunction or altogether stop functioning in colder temperatures. These monitors include internal analytical components and LCD screens that tend to malfunction or fail in colder weather. As such, when the internal analytical components and/or LCD screen does not properly work, the operator cannot obtain and/or take readings from the portable monitor or operate the functions of the portable monitor. As such, during the testing of a landfill well, the testing period may be significantly extended due to slow operation of the portable monitor or be interrupted when the portable monitor fails to properly operate. The only recourse by an operator when a monitor fails is to use a new monitor for testing, detach the monitor from the well and bring the monitor into a warm environment to "thaw out" the monitor, or delay testing of the well until there is a warmer day.

Another problem with these prior art portable monitors is that the monitor cannot simultaneously measure the applied vacuum on the well, the differential vacuum on the well, and the available vacuum that can be applied to the well. These different vacuum values are obtained on different regions of the wellhead. Static pressure or applied vacuum represents the actual pressure applied to the well. Differential vacuum or pressure is the pressure drop across an orifice plate and is used to measure fluid flow through the wellhead. Available vacuum or header pressure is the pressure in the header to the wellhead that can be applied to the landfill well. These prior art portable monitors only have two pressure testing ports that are designed to only determine the vacuum being applied to the landfill. As such, if an operator wanted to determine the available vacuum that can be applied to the well, the operator would be required to reconnect the monitor to obtain such information. Such a procedure is inconvenient, time consuming, and can be difficult and undesirable in inclement weather.

Another problem with these prior art portable monitors is that the portable monitor must be placed on or near the well during testing. As such, the individual using the portable monitor must be constantly near the portable monitor in order to operate the portable monitor, to obtain readings from the monitor, and to determine whether the portable monitor is properly operating. Having to be in close proximity to the portable monitor during testing is inconvenient and can also be uncomfortable during inclement weather.

Another problem with these prior art portable monitors is that the portable monitor is sometimes improperly connected to the wrong well. On large landfill sites, the landfill wells are not always properly marked or easily located. As such, when a tester locates a landfill well and begins the testing of the well, the identity of the well recorded by the tester may be incorrect, thus providing incorrect information about the performance of the well and landfill over a certain time period.

In view of the deficiencies that exist in prior art portable monitors for landfill wells, there is a need for a portable monitor that simplifies the testing of landfill wells and which overcomes the past deficiencies of prior art portable monitors.

SUMMARY OF THE INVENTION

The present invention is directed to an improved portable monitor that can be used to measure one or more properties (e.g., flow rate, temperature, composition, pressure, LEL, etc.) of a fluid stream (e.g., gas and/or liquid steam from a well, etc.). The portable monitor is particularly adapted for use with measuring one or more properties of fluid (e.g., gas, liquid) from a well such as, but not limited to a landfill well; however, it will be appreciated that the portable monitor can be used to measure one or more properties of the fluid in other types of applications (e.g., measure the fluid composition/temperature/pressure/LEL in a cave, measure fluid composition/temperature/pressure/LEL in a sewage system, measure fluid composition/temperature/pressure/LEL in a refinery, etc.). The portable monitor is adapted for indoor and outdoor use. The portable monitor is designed to be used to monitor and measure fluids from one or more wells. The portable monitor is generally designed to only measure one well at a time, then be disconnected from the well and then subsequently reconnected to another well for taking measurements from such other well. The portable monitor is also not designed to be part of an automated control system for the well. The portable monitoring system is manually connected and disconnected to a well by a user. Generally, the portable monitor is disconnected from the well once the readings for the well have been obtained. Information about the well that is measured by the portable monitor can then be used by an operator to adjust the flowrate of fluids from the well. Such adjustments to the well by the user can be manual or can be input by the user into a control system. As can be appreciated, information from the portable monitor can be downloaded into another device that can then use the information from the portable monitor to control the well. However, the portable monitor of the present invention is not generally designed to provide constant control of the well. The portable monitor is primarily designed to be periodically connected to a well (e.g., monthly, semi-annually, yearly, etc.) to take periodic measurements of the well, then be disconnected from the well. The portable monitor is made of durable materials to withstand the outside elements (e.g., rain, cold weather, strong winds, snow, dust, sun, etc.). The portable monitor also has a size, shape and weight that enables a user to easily and conveniently carry the portable monitor to a testing site (e.g., landfill well, etc.). Typically, the portable monitor has a total weight of less than about 20 lbs, typically less than about 10 lbs., and more typically less than about 6 lbs. The portable monitor also typically has a total volume of less than about 500 cubic inches, typically less than about 400 cubic inches, and more typically less than about 250 cubic inches. The portable monitor is designed to be used in a variety of environments. A carrying device (e.g., backpack, brief case, etc.) can be used to conveniently store and/or transport the complete portable monitor; however, this is not required.

In one non-limiting aspect of the present invention, the portable monitor of the present invention includes one or more heating elements. The one or more heating elements are used to provide heating to one or more internal and/or external components of the portable monitor. In prior art portable monitors, one or more components of a prior art portable monitor was prone to sluggishness and even failure when the portable monitor was used in a cold environment (i.e., temperature of less than about 30-40° F.). As such, it was difficult, if not impossible, to monitor gasses in a particular location (e.g., landfill well, etc.) when the weather was cold. The portable monitor of the present invention overcomes this past problem by the use of one or more heating elements. In one non-limiting embodiment of the invention, the one or more heating elements are designed to at least periodically maintain the temperature of one or more components of the portable monitor above about 10° F., typically above about 20° F., more typically about 30° F., even more typically above about 40° F., and still even more typically above about 50° F. The one or more heating elements can be positioned on and/or in the portable monitor to a) maintain all of the components at least periodically above a certain temperature, or b) only maintain one or more components of the portable monitor and/or one or more regions of the portable monitor at least periodically above a certain temperature. In another and/or additional non-limiting embodiment of the invention, the one or more heating elements are located at least partially internally of the housing of the portable monitor. In this particular non-limiting embodiment, the one or more heating elements are partially or fully integrated in the housing of the portable monitor. As can be appreciated, the one or more heating elements can be detachably secured in the housing of the portable monitor. For instance, the housing can include one or more accessible cavities that allows for the insertion and/or removal of one or more components of the one or more heating elements from the housing. In still another and/or additional non-limiting embodiment of the invention, the one or more heating elements are at least partially located on the exterior of the housing of the portable monitor. In one non-limiting aspect of this embodiment, one or more heating elements can be removably or irremovably connected to one or more exterior portions of the housing of the portable monitor. In one non-limiting design, a heating jacket can be used to at least partially encapsulate one or more portions of the housing of the portable monitor. The heating jacket can be designed to detachably connect to the housing of the portable monitor so that the heating jacket can be used only when needed or desired. As can be appreciated, many other or additional configurations of external heating elements can be used to heat one or more portions of the portable monitor. In yet another and/or additional non-limiting embodiment of the invention, the one or more heating elements can include an electric heating coil. As can be appreciated, other or additional types of heating elements can be used. (e.g., radiation elements, etc.). In still yet another and/or additional non-limiting embodiment of the invention, the one or more heating elements are powered by an internal and/or external power source. In one non-limiting aspect of this embodiment, the portable monitor includes an internal power source (e.g., battery, fuel cell, solar cell, etc.) that is used to at least partially energize the one or more heating elements. As can be appreciated, the internal power source can be used to power one or more other components of the portable monitor; however, this is not required. The internal power source can be a rechargeable and/or replaceable power source. In another and/or additional non-limiting aspect of this embodiment, the portable monitor includes an external power source (e.g., external battery pack, electric plug to plug into a 120V/220V electric plug, etc.) that is used to at least partially energize the one or more heating elements. As can be appreciated, the external power source can be used to power one or more other components of the portable monitor; however, this is not required. As can also be appreciated, the external power source can be used to recharge an internal power source when an internal power source exists in the housing of the portable monitor; however, this is not required. In another and/or additional non-limiting embodiment of the invention, the one or more heating elements can be designed to be manually and/or automatically activated. In one non-limiting aspect of this embodiment, the heating elements can be manually activated by a user. Such activation can be by any number of means (e.g., remote activation, switch activation, connection to a power source, etc.). This arrangement allows a user to manually activate one or more of the heating elements when the user determines that the environment is potentially cold enough to possibly adversely affect the portable monitor. In another and/or additional non-limiting aspect of this embodiment, one or more heating elements can be designed to automatically activate when a predetermined low temperature has been detected. The predetermined low temperature setting can be a factory setting and/or a manual setting by an operator. In one non-limiting design, one or more temperature sensors (e.g., temperature coil, electronic sensor, etc.) are positioned on and/or in one or more regions of the housing of the portable monitor to monitor a surrounding temperature. As can be appreciated, other or additional arrangements can be used. In this arrangement, the portable monitor causes one or more heating elements to activate when a low threshold temperature has been detected so as to prevent the temperature of one or more components of the portable monitor to become too cold. In still another and/or additional non-limiting aspect of this embodiment, when an automatic activation arrangement is used, the portable monitor can be designed to allow a user to manually activate and/or deactivate one or more of the heating elements when so desired; however, this is not required. In yet another and/or additional non-limiting aspect of this embodiment, the portable monitor can include a deactivator to automatically deactivate one or more heating elements when the sensed temperature of the heating element and/or the region about the heating element exceeds a predetermined temperature, and/or the one or more heating elements have been activated for a certain period of time; however, this is not required. The predetermined low temperature setting and/or time period of activation setting can be a factory setting and/or a manual setting by an operator. In one non-limiting arrangement, the portable monitor includes a plurality of heating elements or pads. The heating elements or pads are positioned inside the protective housing of the portable monitor. The heating pads are activated and deactivated by a microprocessor. A plurality of thermocouples are located on or near various components inside the housing of the portable monitor. Generally these thermocouples are located in important or critical positions on one or more components in the housing (e.g., printed circuit boards, gas measuring components, pumps, etc.). The thermocouples are designed to send information to the microprocessor, which then uses such information to activate or deactivate one or more of the heating elements or pads. The thermocouples thus provide feedback information to the microprocessor to enable the microprocessor to properly activate or deactivate a certain heating element or pad. As can be appreciated, the microprocessor can activate/deactivate some or all of the heating elements or pads based on the information received from one or more thermocouples that are positioned in different regions of the housing. In one non-limiting arrangement, the microprocessor activates one or more heating elements or pads when the thermocouple measurement from one or more thermocouples is equal to or below some predefined threshold value and deactivates one or more heating elements or pads when the thermocouple measurement from one or more thermocouples is equal to or above some predefined threshold value. In one non-limiting specific arrangement, all of the heating elements or pads are activated when the lowest reading from one or more thermocouple measurements (e.g., one thermocouple measurement, two different thermocouple measurements, three different thermocouple measurements, four different thermocouple measurements, etc.) are equal to or below a threshold value, and all of the heating elements or pads are deactivated when the highest reading from one or more thermocouple measurements are equal to or above a threshold value. In this specific arrangement, generally less than all of the thermocouples in the housing are generating readings above/below/equal to some upper or lower predetermined value to cause the microprocessor to activate/deactivate all or some subset of the heating elements or pads in the housing. Generally the predefined low temperature level is no less than about −10° F., generally no less than about −4° F., more typically no less than about 0° F., and still more typically no less than about 10° F. As can be appreciated, the predefined low temperature level can be set at higher temperatures (e.g., 20° F., 32° F., 40° F., etc.). The predefined high temperature level is generally less than about 130° F., typically less than about 122° F., more typically less than about 115° F., and even more typically less than about 110° F.

In another and/or additional non-limiting aspect of the present invention, the portable monitor includes one or more cooling elements. The one or more cooling elements can be used to provide cooling to one or more internal and/or external components of the portable monitor. When the temperature of one or more components of the portable monitor becomes too hot, the one or more components can be damaged and/or malfunction. To address this overheating problem, the portable monitor of the present invention can include one or more cooling elements. In one non-limiting embodiment of the invention, the one or more cooling elements are designed to at least periodically maintain the temperature of one or more components of the portable monitor below about 200° F., typically below about 150° F., more typically below about 120° F., and even more typically below about 100° F. The one or more cooling elements can be positioned on and/or in the portable monitor to a) maintain all of the components at least periodically below a certain temperature, or b) only maintain one or more components of the portable monitor and/or one or more regions of the portable monitor at least periodically below a certain temperature. In another and/or additional non-limiting embodiment of the invention, the one or more cooling elements are located at least partially internally of the housing of the portable monitor. In this particular non-limiting embodiment, the one or more cooling elements are partially or fully integrated in the housing of the portable monitor. As can be appreciated, the one or more cooling elements can be detachably secured in the housing of the portable monitor. For instance, the housing can include one or more accessible cavities that would allow for the insertion and/or removal of one or more components of the one or more cooling elements from the housing. In still another and/or additional non-limiting embodiment of the invention, the one or more cooling elements are at least partially located on the exterior of the housing of the portable monitor. In one non-limiting aspect of this embodiment, one or more cooling elements can be removably or irremovably connected to one or more exterior portions of the housing of the portable monitor. In one non-limiting design, a cooling jacket could be used that is designed to at least partially encapsulate one or more portions of the housing of the portable monitor. The cooling jacket can be designed to detachably connect to the housing of the portable monitor so that the cooling jacket can be used only when needed or desired. As can be appreciated, many other or additional configurations of external cooling elements can be used to cool one or more portions of the portable monitor. In yet another and/or additional non-limiting embodiment of the invention, the one or more cooling elements include an electric fan. As can be appreciated, other or additional types of cooling elements can be used, (e.g., heat sink arrangement, ice or chemical cooling pouch, etc.). In still yet another and/or additional non-limiting embodiment of the invention, the one or more cooling elements are powered by an internal and/or external power source. In one non-limiting aspect of this embodiment, the portable monitor includes an internal power source (e.g., battery, fuel cell, solar cell, etc.) that is used to at least partially energize the one or more cooling elements. As can be appreciated, the internal power source can be used to power one or more other components of the portable monitor; however, this is not required. The internal power source can be a rechargeable and/or replaceable power source. In another and/or additional non-limiting aspect of this embodiment, the portable monitor includes an external power source (e.g., external battery pack, electric plug to plug into a 120V/220V electric plug, etc.) that is used to at least partially energize the one or more cooling elements. As can be appreciated, the external power source can be used to power one or more other components of the portable monitor; however, this is not required. As can also be appreciated, the external power source can be used to recharge an internal power source when an internal power source exists in the housing of the portable monitor; however, this is not required. In another and/or additional non-limiting embodiment of the invention, the one or more cooling elements can be designed to be manually and/or automatically activated. In one non-limiting aspect of this embodiment, the cooling elements can be manually activated by a user. Such activation can be by any number of means (e.g., remote activation, switch activation, connection to a power source, etc.). This arrangement allows a user to manually activate one or more of the cooling elements when the user determines that the environment is potentially hot enough to possibly adversely affect the portable monitor. In another and/or additional non-limiting aspect of this embodiment, one or more cooling elements can be designed to automatically activate when a predetermined high temperature has been detected. The predetermined high temperature setting can be a factory setting and/or a manual setting by an operator. In one non-limiting design, one or more temperature sensors (e.g., temperature coil, electronic sensor, etc.) are positioned on and/or in one or more regions of the housing of the portable monitor to monitor a surrounding temperature. As can be appreciated, other or additional arrangements can be used. In this arrangement, the portable monitor causes one or more cooling elements to activate so as to prevent the temperature of one or more components of the portable monitor from becoming too hot. In still another and/or additional non-limiting aspect of this embodiment, when an automatic activation arrangement is used, the portable monitor can be designed to allow a user to manually activate and/or deactivate one or more of the cooling elements when so desired; however, this is not required. In yet another and/or additional non-limiting aspect of this embodiment, the portable monitor can include a deactivator to automatically deactivate one or more cooling elements when the sensed temperature of the cooling element and/or region about the cooling element falls below a predetermined temperature, and/or the one or more cooling elements have been activated for a certain period of time; however, this is not required. The predetermined temperature setting and/or time period of activation setting can be a factory setting and/or a manual setting by an operator.

In still another and/or additional non-limiting aspect of the present invention, the portable monitor includes a plurality of pressure sensors. In one non-limiting embodiment of the invention, the portable monitor includes three or more three pressure sensors. The three or more pressure sensors enable the portable monitor to simultaneously measure three or more different pressures. For instance, when the portable monitor is used to measure pressures on a gas well wherein gas is being drawn by a vacuum (e.g., landfill well, etc.), the three or more pressure sensors enable an operator to simultaneously measure the static or applied vacuum pressure on the well, the impact or differential pressure on the well, and the available vacuum or header pressure that can be applied to the well. Prior art portable monitors for landfill wells only included two pressure sensors. These two pressure sensors were used to measure the applied vacuum pressure or static vacuum of the well. As such, if an operator wanted to measure the available vacuum pressure of the well, the operator had to disconnect one of the tubes from the applied vacuum port on the well and reconnect the tube at available pressure vacuum port on the well. This procedure was not only time consuming and inconvenient, especially in inclement weather, the accuracy of the data readings potentially could be compromised during the disconnecting and reconnecting of the vacuum tubes. These problems associated with prior portable monitors are overcome by the portable monitor of the present invention. The portable monitor of the present invention enables an operator to connect the portable monitor of the present invention to all three pressure ports on a well so that the applied or static vacuum pressure the differential pressure, and the available vacuum pressure of the well can be determined without having to further reconnect and disconnect vacuum tubes.

In yet another and/or additional non-limiting aspect of the present invention, the portable monitor is a multi-unit system. In one non-limiting embodiment of the invention, the portable monitor includes a separate control unit and a separate measuring unit. Prior art portable monitors were in the form of a single unit. This single unit design required the operator to temporarily mount the portable monitor on a portion of the well or at a region about the well, connect all of the sensors and/or pressure tubes to the well, and then press multiple buttons on the portable unit to perform the required tests for the well. This single unit design of the prior art portable monitor made it inconvenient and difficult for the operator to take readings and perform the required operations on the monitor while the portable monitor was mounted on or about the well. During inclement weather, the taking of readings from the prior art portable monitor and the performing of the required operations on the portable monitor made such testing even more inconvenient and difficult, if not impossible. The plurality of units of the portable monitor of the present invention overcomes these past problems with prior art portable monitors. The measuring unit of the portable monitor of the present invention is designed to connect to various portions of a well so as to measure one or more parameters of the well. The control unit of the portable monitor of the present invention is designed to provide instructions and/or commands to the measuring unit, and/or to receive information from the measuring unit. As such, an operator is able to 1) remotely monitor the operation of the measuring unit, 2) remotely control one or more operations of the measuring unit, 3) remotely review information that is tested and/or measured by the measuring unit, and/or 4) remotely process information receive from the measuring unit. The multi-unit design of the portable monitor enables an operator to 1) first temporarily connect the measuring unit to the well or at a location near the well and connect on the required tubes, wires, etc. to the measuring unit, and 2) then use the control unit to begin the required operations of the measuring unit and acquire all of the required data from the measuring unit from a remote location. The measuring unit and control unit can communicate between one another wirelessly (e.g., IR connection, RF connection, etc.) and/or through a cable connection (fire wire connection, USB connection, serial cable, etc.). This wireless configuration allows an operator to make adjustments from remote locations and also enables the operator to see how such adjustments effect the well being monitored without having to walk back and forth between the monitor and the valving on the well. The wireless connection enables an operator to be located in a remote location (e.g., vehicle, power plant control room, sheltered area, header valve on the well, etc.) during the testing of the well. This configuration of the portable monitor enables an operator to connect the measuring unit to a well and then move to a sheltered area or other remote location (e.g., other regions on the well, etc.) to operate and/or monitor operation of the measuring unit. As such, during inclement weather conditions, the operator only has to expose oneself to such conditions during the setting up and dismantling of the measuring unit on the well. The testing period of the well can then be accomplished in a protected or sheltered area. Such an arrangement is a significant improvement over prior art portable monitors. In situations wherein a wireless connection cannot be created and/or is not desired by the operator, a cable connection can be connected between the control unit and the measuring unit. Even with use of a cable connection, the operator can operate/monitor the measuring unit from the control unit in a more convenient manner (e.g., sit in a chair, sit on an ATV, sit in a car located close to the measuring unit, etc.).

In another and/or additional non-limiting aspect of the present invention, the measuring unit includes the pressure sensors, fluid pump(s), chemical analyzers, heating elements or pads, and thermocouples. The measuring unit can optionally include one or more microprocessors and software to calculate one or more properties of fluid analyzed from a well. Alternatively, the control unit includes one or more microprocessors and software to calculate one or more properties of fluid analyzed from a well based on data sent from the measuring unit to the control unit. In one non-limiting embodiment of the invention, the control unit does not include pressure sensors, fluid pump(s), and chemical analyzers. In another and/or alternative non-limiting embodiment, the measuring unit optionally includes one or more heating elements or pads and/or and thermocouples.

In still yet another and/or additional non-limiting aspect of the present invention, the portable monitor is designed to provide geographic location information. In one non-limiting embodiment of the invention, the measuring unit and/or control unit includes a G.P.S. component that provides G.P.S. location information. Many well locations are located in remote locations. Furthermore, on some landfill sites, multiple landfill wells exist. The use of G.P.S. can be used to confirm the location of the proper landfill well to be tested, and/or locate the landfill well to be tested. The G.P.S. location function on the portable monitor can be used to easily identify which well was tested and the exact location of a well that was tested and/or is to be tested. In one non-limiting aspect of this embodiment, the control unit includes a G.P.S. component that provides G.P.S. location information. In another non-limiting aspect of this embodiment, the measuring unit includes a G.P.S. component that provides G.P.S. location information.

In another and/or additional non-limiting aspect of the present invention, the portable monitor includes a measuring unit has a durable design. In one non-limiting embodiment of the invention, the measuring unit is designed to be used in a wide variety of environments. When in use, the measuring unit may be exposed to high temperatures, low temperatures, rain, snow, ice, fog, dust, etc. The housing of the measuring unit is designed to protect the internal components from such environmental conditions. In one non-limiting aspect of this embodiment, the measuring unit has an Ingress Protection Rating for dust of at least 4, typically at least 5, and more typically 6; and an Ingress Protection Rating for water of at least 3, more typically at least 4, even more typically at least 5, still more typically at least 6, and still even more typically at least 7. In one non-limiting design of the measuring unit, the Ingress Protection Rating for the measuring unit is at least IP43, typically at least IP55, and more typically at least IP67. Such IP rating enables the measuring unit to be used in rainy conditions, snowy conditions, sunny conditions, dusty condition, etc. and still operate properly. In another and/or alternative non-limiting aspect of this embodiment, the measuring unit is designed so that it can properly operate in temperatures at least as low as about 32° F., more typically at least as low as about 0° F., and even more typically at least as low as about −20° F., and in temperatures at least as high as about 90° F., typically at least as high as about 120° F., and more typically at least as high as about 140° F. In another and/or alternative non-limiting embodiment of the invention, the housing of the measuring unit is made of a durable material that protects the internal components of the measuring unit from damage when the measuring unit falls from a well mounting and/or is inadvertently dropped on the ground. The one or more materials used to at least partially form the housing can be include, but are not limited to, metal, plastic, rubber, fiber and/or carbon reinforced material, etc.

In still another and/or additional non-limiting aspect of the present invention, the measuring unit is a portable unit that can perform a variety of functions. In one non-limiting embodiment of the invention, the measuring unit has a weight of less than about 20 lbs, typically less than about 10 lbs., and more typically less than about 5 lbs. The measuring unit also typically has a volume of less than about 500 cubic inches, typically less than about 300 cubic inches, and more typically less than about 200 cubic inches. In another and/or additional non-limiting embodiment of the invention, the measuring unit includes a plurality of pressure sensors to enable the measuring unit to detect/measure one or more pressures. In one non-limiting aspect of this embodiment, the measuring unit includes at least three pressure sensors to enable the portable monitor to simultaneously detect/measure at least three different pressures. In one particular non-limiting design of the measuring unit, the measuring unit is able to be simultaneously connected to at least three vacuum pressure ports on a well to enable the measuring unit to measure the static pressure, the applied vacuum pressure and the available vacuum pressure of the well; however, this is not required. In another and/or additional aspect of this embodiment of the invention, the detection/measurement of one or more pressures by the measuring unit can be used to calculate the flow rate of fluid at or near the location of the detected pressures. In one particular non-limiting design, the measuring unit and/or control unit can be designed to calculate the flow rate of landfill gas into the landfill well based at least partially on one or more pressures detected/measured by the measuring unit. As can be appreciated, the measuring unit and/control unit can be used to calculate the flow rate of other or additional fluids based at least partially on one or more pressures detected/measured by the measuring unit. In still another and/or additional non-limiting embodiment of the invention, the measuring unit can include one or more chemical analyzers to identify and/or measure the concentration of one or more components in a fluid stream (e.g., landfill gas, etc.). In one non-limiting aspect of the present invention, the measuring unit can include one or more chemical analyzers to identify and/or measure the concentration of one or more components in a fluid stream. In one particular non-limiting design, the measuring unit can be used to identify gasses and/or measure gas concentration from a landfill well. In such a design, the measuring unit includes one or more chemical analyzers that are designed to identify and/or measure the concentration of methane, carbon dioxide and oxygen. As can be appreciated, the measuring unit can also include one or more chemical analyzers that can be used to identify and/or measure the concentration of other gasses from a landfill well (e.g., carbon monoxide, chlorine, cyanide, hydrogen, hydrogen sulfide, mercaptan, nitric oxides, nitrogen, sulfur oxides, etc.). In one non-limiting configuration, the measuring unit includes a plurality of sensors to simultaneously measure the concentration of two or more components in the fluid from the landfill well. In such a configuration, the measuring unit can, but is not required to include two or more separate chemical analyzers. In another non-limiting configuration, the measuring unit includes a plurality of sensors to simultaneously measure the concentration of three or more components in the fluid from the landfill well. In such a configuration, the measuring unit can, but is not required to include three or more separate chemical analyzers. In still another non-limiting configuration, the measuring unit includes a plurality of sensors to simultaneously measure the concentration of four or more components in the fluid from the landfill well. In such a configuration, the measuring unit can, but is not required to include four or more separate chemical analyzers. When the measuring unit is designed to simultaneously measure the concentration of three components in the fluid, such components generally include carbon dioxide, methane and oxygen. When the measuring unit is designed to simultaneously measure the concentration of four components in the fluid, the fourth component is generally nitrogen, hydrogen sulfide, carbon monoxide, chlorine, cyanide, hydrogen, mercaptan, nitric oxides, or sulfur oxides. In one specific design, the fourth component is nitrogen or hydrogen sulfide. In another specific design, the fourth component is nitrogen. In still another specific design, the fourth component is hydrogen sulfide. When the measuring unit is designed to simultaneously measure the concentration of five components in the fluid, the five components generally include carbon dioxide, methane, oxygen, nitrogen and hydrogen sulfide. The one or more chemical analyzers used to identify and/or measure gas concentration can be designed to be replaceable in the measuring unit so that the measuring unit can be customized by the operator; however, this is not required. As can also be appreciated, when the measuring unit is designed for uses other than or in addition to measuring landfill gas, the measuring unit can include chemical analyzers that are designed to measure the desired gasses and/or liquids in a tested fluid stream. In another and/or additional non-limiting aspect of this embodiment, one or more chemical analyzers in the measuring unit can include analyzers such as, but not limited to, IR measuring cells, galvanic cells, etc. In still another and/or additional non-limiting aspect of this embodiment, the measuring unit can include one or more chemical analyzers to measure the lower explosive limit (LEL) and/or upper explosive limit (UEL) of one or more components in a fluid stream. As can be appreciated, a separate chemical analyzer may not be required to measure the lower explosive limit (LEL) and/or upper explosive limit (UEL) of one or more components in a fluid stream if the information from the other chemical analyzers is used to calculate the lower explosive limit (LEL) and/or upper explosive limit (UEL) of one or more components in a fluid stream via a microprocessor or the like. In one particular non-limiting design, the measuring unit measures the LEL and/or UEL of methane in a fluid stream. For methane, the LEL is at about 5% and the UEL is about 15%. This LEL and/or UEL reading can be useful for the operator of the portable monitor. At concentrations in air below the LEL, there is not enough explosive component (e.g., methane, hydrogen, etc.) to continue an explosion; whereas at concentrations above the UEL the explosive component has displaced so much air that there is not enough oxygen to begin an explosive reaction. As can be appreciated, the LEL and/or UEL reading can be determined by the measuring unit and/or control unit for other or additional explosive components. In still another and/or additional non-limiting aspect of this embodiment, the measuring unit can include one or more pumps to draw fluid into and/or expel fluid out of the measuring unit. In one non-limiting design, at least one pump is used to draw landfill gas through one of the pressure sensors in the measuring unit so that the gas can then be directed to one or more chemical analyzers in the measuring unit. In yet another and/or additional non-limiting embodiment of the invention, the measuring unit can include one or more temperature ports used to receive temperature information from one or more temperature probes. The temperature measurement can be used to facilitate in flowrate calculations, provide information on the activity of a landfill, etc. In one non-limiting aspect of this embodiment, the measuring unit includes at least one temperature port that is designed to be connected to a temperature probe that is in turn connected to a temperature monitoring port of a landfill well. The temperature probe can be designed to measure the temperature of the landfill gas being drawn from a landfill and through the landfill well. In still yet another and/or additional non-limiting embodiment of the invention, the measuring unit can include one or more indicators to facilitate in the use and/or operation of the measuring unit. Such indicators can include, but are not limited to, heater activation/deactivation indicator, battery level indicator, battery charge indicator, battery use indicator, on/off indicator, coupler/port indicator to indicate when coupler/port is properly and/or improperly connected, coupler/port indicator to indicate when coupler/port is in use, malfunction indicator, malfunction indicator, etc. The one or more indicators can be in a variety of forms such as, but not limited to, a sound indicator, a visual indicator (LED light, LCD light or panel, incandescent light, etc.), etc. In another and/or additional non-limiting embodiment of the invention, the measuring unit can include one or more monitors (e.g., LCD panel, etc.) to enable an operator to view/use one or more operations and/or functions of the measuring unit, enable an operator to control one or more operations and/or functions of the measuring unit, view one or more indicators for the measuring unit, etc. In still another and/or additional non-limiting embodiment of the invention, the measuring unit can include one or more buttons and/or switches. The one or more buttons and/or switches can be used to enable an operator to activate and/or deactivate one or more functions of the measuring unit, to display and/or access information from the measuring unit, to provide instructions and/or information to the measuring unit, etc. In yet another and/or additional non-limiting embodiment of the invention, the measuring unit can include a power pack compartment used to store one or more energy cells. The one or more energy cells can be used to provide power to one or more components of the measuring unit. The power pack compartment can be designed to enable easy access to enable the servicing and/or replacement of one or more energy cells; however, this is not required. The power pack compartment can include a power port to enable one or more of the energy cells to be recharged while contained in the power pack compartment; however, this is not required. In yet another and/or additional non-limiting embodiment of the invention, the measuring unit can include one or more connection ports used a) to connect the measuring unit to the control unit to enable data transfer between the two units, b) to connect the measuring unit to a phone jack, c) to connect the measuring unit to an ethernet connector, d) to connect the measuring unit to another computer, e) to connect the measuring unit to a computer, data storage device and/or printer, etc. The one or more connection ports can be designed to accept one or more types of cables (e.g., fire wire, USB, serial cable, phone cable, ethernet cable, etc.). In still yet another and/or additional non-limiting embodiment of the invention, the measuring unit includes one or more circuits and/or microprocessors (e.g., Intel processor, flash memory, hard drive, etc.) to operate one or more software and/or hardware programs (e.g., calibration hardware/software, flowrate calculation hardware/software, BTU calculation software, gas analysis hardware/software, communication hardware/software, mode of operation hardware/software, pressure analysis hardware/software, temperature analysis hardware/software, etc.) that are loaded/included in the measuring unit. In yet another and/or additional non-limiting embodiment of the invention, the measuring unit can include one or more expansion slots (e.g., Type1 and/or Type II expansion slots) to enable additional hardware and/or software to be added to the measuring unit (e.g., added memory, wireless technology, etc.). In still yet another and/or additional non-limiting embodiment of the invention, the measuring unit can include one or more sensors to detect/measure ambient conditions (e.g., temperature, pressure, humidity, etc.). In another and/or additional non-limiting embodiment of the invention, the measuring unit can include one or more filter, liquid traps, etc. that are used to protect one or more components of the measuring unit when testing fluids (e.g., landfill gas, etc.). In still another and/or additional non-limiting embodiment of the invention, the measuring unit is able to at least perform the testing and/or analysis functions of prior art portable monitors (e.g., GEM 500, GEM 2000, GEM 2000 PLUS, etc.).

In yet another and/or additional non-limiting aspect of the present invention, the portable monitor includes a control unit that is designed to be durable. In one non-limiting embodiment of the invention, the control unit is designed to be used in a wide variety of environments. The housing of the control unit is designed to protect the internal components from various types of environmental conditions. In one non-limiting aspect of this embodiment, the control unit has an Ingress Protection Rating for dust of at least 4, typically at least 5, and more typically 6; and an Ingress Protection Rating for water of at least 3, more typically at least 4, even more typically at least 5, still more typically at least 6, and still even more typically at least 7. In one non-limiting design of the control unit, the Ingress Protection Rating for the control unit is at least IP43, typically at least IP55, and more typically at least IP67. Such IP rating enables the control unit to be used in rainy conditions, snowy conditions, sunny conditions, dusty conditions, etc. and still operate properly. In another and/or alternative non-limiting aspect of this embodiment, the control unit is designed so that it can properly operate in temperatures at least as low as about 32° F., more typically at least as low as about 0° F., and even more typically at least as low as about −20° F.; and in temperatures at least as high as about 90° F., typically at least as high as about 120° F., and more typically at least as high as about 140° F. In another and/or alternative non-limiting embodiment of the invention, the housing of the control unit is made of a durable material that protects the internal components of the control unit from damage. The one or more materials used to at least partially form the housing include, but are not limited to, metal, plastic, rubber, fiber and/or carbon reinforced material, etc. In one non-limiting design, the control unit is a highly durable portable hand-held device (e.g., PDA device, Palm PC device, BLACKBERRY device, etc.). A BLACKBERRY device is a type of mobile e-mail and smartphone device. One non-limiting highly durable portable hand-held device that can be used as the control unit includes a TRIMBLE RECON that is offered by Trimble Navigation Limited, 935 Stewart Drive, Sunnyvale, Calif. 94085. As can be appreciated, other highly durable portable hand-held devices can be used for the control unit of the portable monitor of the present invention.

In still yet another and/or additional non-limiting aspect of the present invention, the control unit is a portable unit that can perform a variety of functions. In one non-limiting embodiment of the invention, the control unit has a weight and size that are less than the measuring unit. In one non-limiting aspect of this embodiment, the control unit has a weight of less than about 5 lbs, typically less than about 2 lbs., and more typically less than about 1.5 lbs. The control unit typically has a volume of less than about 100 cubic inches, typically less than about 75 cubic inches, and more typically less than about 50 cubic inches. In another and/or additional non-limiting embodiment of the invention, the control unit includes one or more circuits and/or microprocessors (e.g., Intel PXA255 XScale processor, flash memory, etc.) to operate one or more software and/or hardware programs that are loaded in the control unit. Non-limiting examples of software that can be loaded in the control unit includes, but is not limited to, G.P.S. software, navigation software, wireless communication software, photograph/video software, sound/music software, sound recording software, voice recognition software, file/data transfer software, internet browser software, wordprocessor software, touch screen software, database software, spreadsheet software, operating system software, scanner software, printer software, power point software, CAD software, email software, calendar software, address book software, security software, t.v. software, radio software, data management software, software to operate/monitor the measuring unit of the portable monitor, calibration software for the control unit and/or measuring unit, handwriting recognition software, diagnostic software for the control unit and/or measuring unit, time/date/timer software, software to make recommendations for landfill gas flowrate into well, BTU calculation software, LEL calculation software, EPA software, environmental software, software used to process landfill well and gas data, etc. In still another and/or additional non-limiting embodiment of the invention, the control unit can include wireless technology to enable the control unit to communicate with the measuring unit, the internet, mobile phone systems and/or other remote locations and/or systems. Such technology includes, but is not limited to, 802.11 wireless technology, Blue tooth technology, IR technology, etc. In yet another and/or additional non-limiting embodiment of the invention, the control unit can include a camera, microphone, speaker, etc. to enhance the multimedia features of the control unit; however, this is not required. In still yet another and/or additional non-limiting embodiment of the invention, the control unit can include one or more indicators to facilitate in the use and/or operation of the control unit. Such indicators can include, but are not limited to, battery level indicator, battery charge indicator, battery use indicator, on/off indicator, coupler indicator to indicate when coupler is properly and/or improperly connected, coupler indicator to indicate when coupler is in use, malfunction indicator, etc. The one or more indicators can be in a variety of forms such as, but not limited to, a sound indicator, a visual indicator (LED light, LCD light or panel, incandescent light, etc.). In another and/or additional non-limiting embodiment of the invention, the control unit can include one or more monitors (e.g., LCD panel, etc.) to enable an operator to view/use one or more operations and/or functions of the control unit; view one or more indicators for the control unit; view/control one or more features of the measuring unit; view/use one or more software programs on the control unit, view/use email and/or text messages, etc. In still another and/or additional non-limiting embodiment of the invention, the control unit includes one or more buttons and/or switches. The one or more buttons and/or switches can be used to enable an operator to activate and/or deactivate one or more functions of the control unit and/or measuring unit, to display and/or access information from the control unit and/or measuring unit, to provide instructions and/or information to the control unit and/or measuring unit, volume control, display brightness control, etc. In yet another and/or additional non-limiting embodiment of the invention, the control unit can include a power pack compartment that is used to store one or more energy cells. The one or more energy cells can be used to provide power to one or more components of the control unit. The power pack compartment can be designed to enable easy access to enable the servicing and/or replacement of one or more energy cells; however, this is not required. The power pack compartment can include a power port to enable one or more of the energy cells to be recharged while contained in the power pack compartment; however, this is not required. In yet another and/or additional non-limiting embodiment of the invention, the control unit can include one or more connection ports. The one or more connection ports can be used a) to connect the control unit to the measuring unit to enable data transfer between the two units, b) to connect the control unit to a phone jack, c) to connect the control unit to an ethernet connector, d) to connect the control unit to another computer, e) to connect the control unit to a computer, data storage device and/or printer, etc. The one or more connection ports can be designed to accept one or more types of cables (e.g., fire wire, USB, serial cable, phone cable, ethernet cable, etc.). In yet another and/or additional non-limiting embodiment of the invention, the control unit can include one or more expansion slots (e.g., Type1 and/or Type II expansion slots) to enable additional hardware and/or software to be added to the control unit (e.g., added memory, bar code scanner, wireless technology, etc.).

It is a non-limiting object of the present invention to provide a portable monitor that can be used to more easily obtain information about fluids.

It is another and/or additional non-limiting object of the present invention to provide a portable monitor that can be used to measure fluid pressure and/or fluid composition.

It is still another and/or additional non-limiting object of the present invention to provide a portable monitor that can be used to measure gas pressures and composition of gasses.

It is yet another and/or additional non-limiting object of the present invention to provide a portable monitor that can used to measuring gas pressures and composition of gasses from landfills.

It is still yet another and/or additional non-limiting object of the present invention to provide a portable monitor that can operate in cold temperatures.

It is another and/or additional non-limiting object of the present invention to provide a portable monitor that includes a heater.

It is still another and/or additional non-limiting object of the present invention to provide a portable monitor that can simultaneously measure three or more pressures.

It is yet another and/or additional non-limiting object of the present invention to provide a portable monitor that includes a control unit and a measuring unit.

It is still yet another and/or additional non-limiting object of the present invention to provide a portable monitor that includes wireless communication between a control unit and a measuring unit.

It is yet another and/or additional non-limiting object of the present invention to provide a portable monitor that provides G.P.S. information.

These and other advantages will become apparent to those skilled in the art upon the reading and following of this description taken together with the accompanying drawings.

BRIEF DESCRIPTION OF THE DRAWINGS

Reference may now be made to the drawings, which illustrate a non-limiting embodiment that the invention may take in physical form and in certain parts and arrangements of parts wherein.

DESCRIPTION OF NON-LIMITING EMBODIMENTS

The solid waste and environmental industry uses field technicians to measure, monitor and store environmental information at particular industrial sites and landfill sites. When measuring gases from a landfill well, information regarding methane, carbon dioxide and oxygen is desirable to determine the environmental impact of the landfill and the potential energy from methane gas that can be obtained from the landfill. The present invention is directed to a portable monitor that can be used by field technicians to obtain gas flow rates and gas composition from landfill wells and will be described with particular reference thereto; however, it will be appreciated that the portable monitor of the present invention can be used in other or additional applications.

Figure 1:
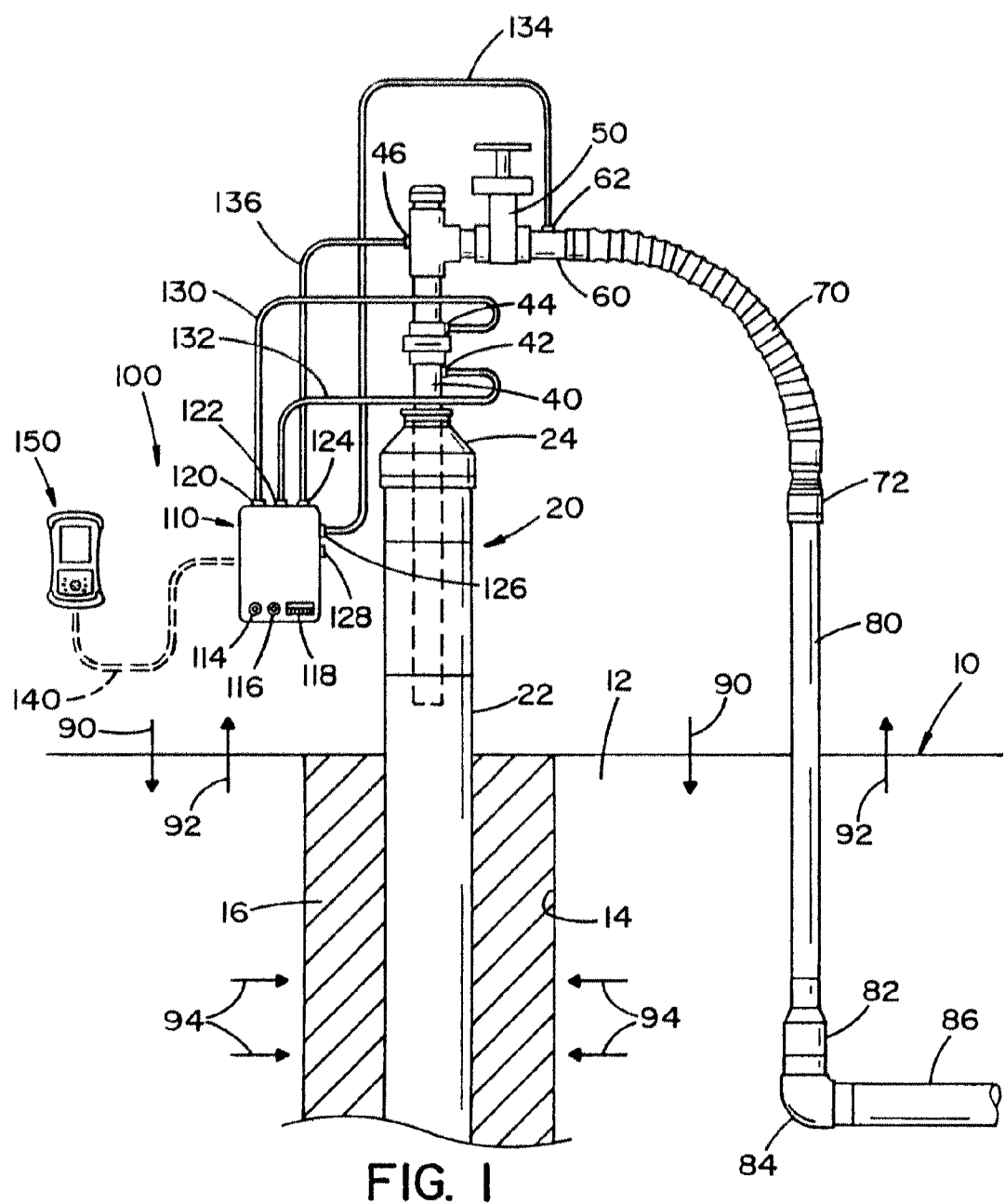
FIG. 1 is a schematic view of a landfill well being monitored by the portable monitor in accordance with the present invention.

Referring now to the drawings wherein the showing is for the purpose of illustrating a non-limiting preferred embodiment of the invention only and not for the purpose of limiting the same, FIG. 1 illustrates a conventional landfill gas extraction system. As illustrated in FIG. 1, there is provided a landfill 10, containing waste 12. A well 20 is drilled into landfill 10. As can be appreciated, more than one well can be drilled in landfill 10. When more than one well is drilled in a landfill, two or more wells can be interconnected together by pipelines; however, this is not required.

The one or more wells 20 typically include one or more vertically-oriented pipes 22 installed in a well bore 14 in the waste of the landfill. Backfill 16 is typically inserted into the well bore after pipe 22 is inserted into the well bore. The depth of pipe 22 into the well bore and the number of wells formed in the landfill typically depends on the size and depth of the landfill. The one or more pipes 22 typically have perforations or slotted sections, not shown, disposed along the pipes and/or at or near the end portion of the pipes. As can be appreciated, the well can alternatively be formed of horizontal trenches or areas filled with gravel. These trenches or areas may be isolated from the atmosphere by a plastic liner or other impermeable barrier.

The top of the well 20 includes a well header 24 on the top end of pipe 22. The top of header 24 includes a inlet pipe 40. The inlet pipe 40 extends through header 24 and partially into the top portion of pipe 22. The inlet pipe includes three side openings or ports 42, 44, 46. Openings 42 and 44 are pressure ports to enable pressure readings to be obtained. Pressure port 42 provides a pressure reading for the static pressure in well 20. The static pressure is also known as the applied vacuum to the well. This pressure port is located on the well side control valve and represents the actual pressure on the well. Pressure port 44 provides a pressure reading for the differential pressure. This pressure measures the pressure drop across and orifice or some other type of flow restrictor, not shown. This pressure is taken down stream from pressure port 42. Opening 46 in the top portion of the inlet pipe is to allow for a temperature reading for the landfill gas being drawn into the well from the landfill. A wellhead valve 50 is connected to the top portion of inlet pipe 40. The wellhead valve is used to control the flowrate of landfill gas from the landfill into the well. The wellhead valve is typically includes a gate valve with an O-ring; however, this is not required. Connected to the wellhead valve is a pipe coupler 60 that includes a pressure port 62. Pressure port 62 is located downstream from the wellhead valve. Pressure port 62 provides a pressure reading for the available vacuum pressure that can be applied to the well. A flexible pipe portion 70 is secured to pipe coupler 60. Flexible pipe portion 70 is in turn connected to feed pipe 80 typically by a flexseal coupling 72 that is used to direct the landfill gas to a flare and/or a processing unit for further processing of the landfill gas. Feedpipe 80 typically is inserted to some depth in ground as illustrated in FIG. 1. The feedpipe is commonly connected to a reducer 82 which in turn is connected at one end to an elbow 84. The outer end of the elbow 84 is connected to pipe 86 that directs the landfill gas away from the landfill. A pump, not shown, is generally connected to pipe 86. The pump is used to apply a vacuum to the well. This vacuum can be measured by pressure port 62.

The landfill 10 typically includes one or more top layers, not shown, that are inserted over waste 12. The one or more top layers can include sand, dirt, gravel, etc. The one or more top layers can include one or more layers of materials, not shown, to at least partially entrap gasses under the one or more top layers; and/or control and/or reduce the flow rate of gasses through the one or more top layers; however, this is not required.

The arrows in FIG. 1 illustrate the flow of gasses into and out of a typical landfill 10. The arrows 90 pointing into the landfill illustrate air (e.g., oxygen, nitrogen, etc.) being drawn into the landfill. The arrows 92 pointing upward from the landfill illustrate landfill gas (e.g., methane, carbon dioxide, etc.) escaping the landfill through the one or more top layers of the landfill. The escape of landfill gas through the one or more top layers of the landfill can be partially the result of not enough landfill gas being drawn through pipe 22 of well 20. The arrows 94 pointing toward pipe 22 illustrate landfill gas being drawn into pipe 22. When too large a volume of landfill gas is drawn into well 20, the pressure differential between the landfill and atmosphere can result in air being drawn into the landfill as indicated by arrows 90. When air enters the landfill, anaerobic degradation of the waste in the landfill can be interrupted until the oxygen is consumed by aerobic processes. If very large quantities of air are introduced into the landfill, either through natural occurrence or overly aggressive operation of the landfill well, a partly unsupported subsurface combustion of the buried waste can be initiated. Such subsurface fires can be difficult to control or extinguish once started, and can also present health and safety hazards. The presence of carbon monoxide, carbon dioxide, and hydrogen sulphide in the landfill gas can be used as indicators of poorly supported combustion within the landfill. When too little of the landfill gasses is drawn into the well 20, gas pressure builds-up in the landfill and results in an increased rate at which the landfill gas passes through the one or more top layers of the landfill and into the atmosphere. As such, a "tradeoff" exists between extracting or "pulling" too high a flow rate of the landfill gas into the well and entraining excessive atmospheric air, and pulling too little landfill gas through the well and recovering less landfill gas and allowing more landfill gas to enter the atmosphere.

To collect the landfill gas from the landfill, the pressure in the well 20 is reduced below that of the landfill gas in the landfill. The amount of "pull" exerted by the well on the landfill gas is controlled by operation of the blower and/or compressor, not shown, and/or by flow-controlling valves associated with the well. Reducing the pressure too much will tend to pull air through the top layer and into the landfill. However, the requisite amount of pull to cause air intrusion will vary due to a variety of factors including unknown local landfill gas generation rates and the consistency of the waste and soil in the landfill.

The portable monitor of the present invention is designed to provide the needed information to a field operator to enable the operator to adjust and control the flowrate of landfill gas into the landfill well so as to a) achieve a steady state of operation of the gas collection system, b) stabilize the rate and quality of extracted landfill gas, c) achieve and maintain effective subsurface gas migration control, d) achieve and maintain effective surface gas emissions control, e) assist with proper operation of control and recovery equipment, f) avoid well "over-pull" and maintain a healthy anaerobic state within the landfill, g) optimize landfill gas recovery for energy recovery purposes, h) control nuisance landfill gas odors, i) prevent or control subsurface landfill fires, j) protect structures on and near the landfill, and/or k) meet environmental and regulatory compliance requirements for landfills. Individual landfill wells are periodically tested (e.g., monthly, quarterly, yearly, etc.) to determine the performance and status of the landfill well. After measurements are taken by the portable monitor of the present invention, the portable monitor is disconnected from the landfill well, adjustments (e.g., adjust flowrate, increase vacuum, etc.), if any, are made to the landfill well, and then portable monitor is moved to another landfill well to repeat the monitoring and measuring process for such other landfill well. This process is generally repeated for many different landfill wells located at the same and/or at different landfill sites.

Figure 2:
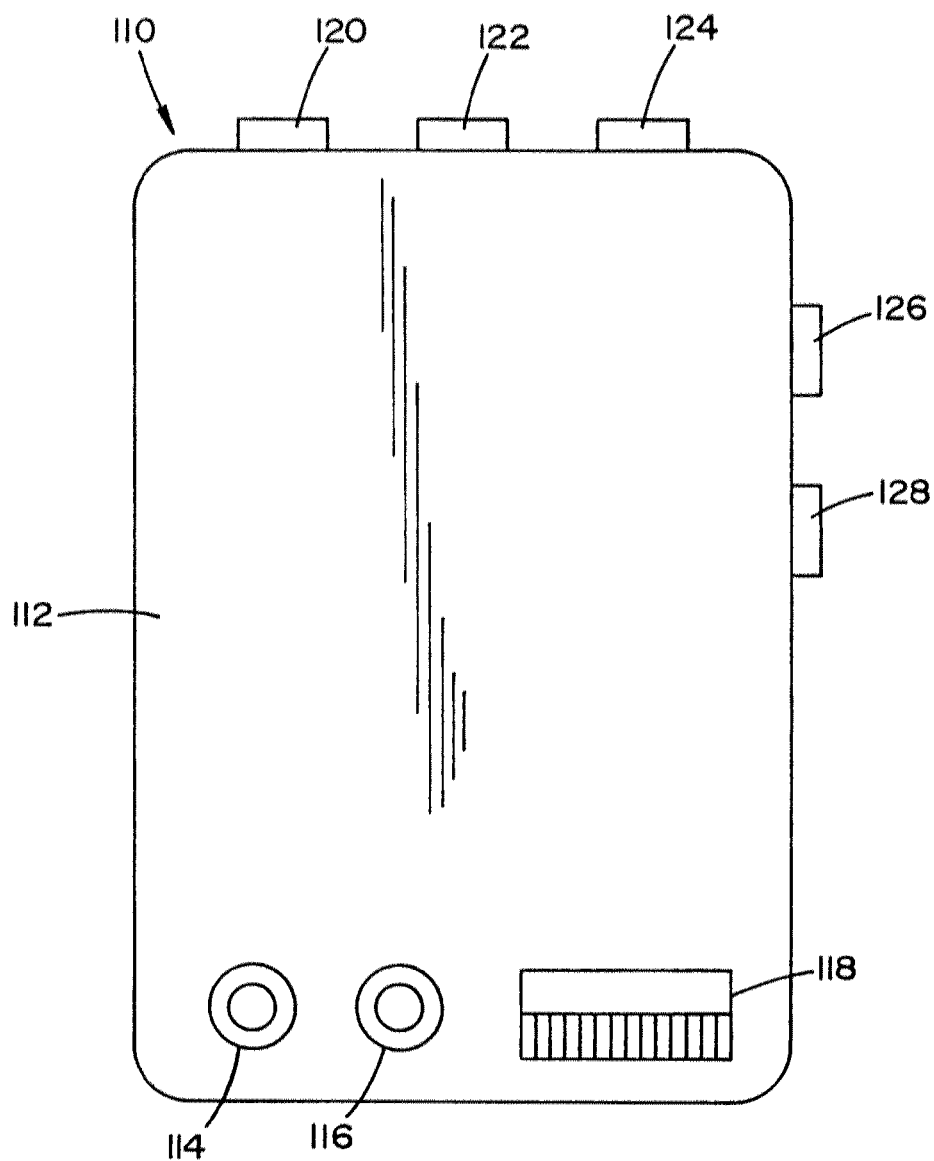
FIG. 2 is a top view of one non-limiting embodiment of a measuring unit of the portable monitor in accordance with the present invention.
Figure 3:
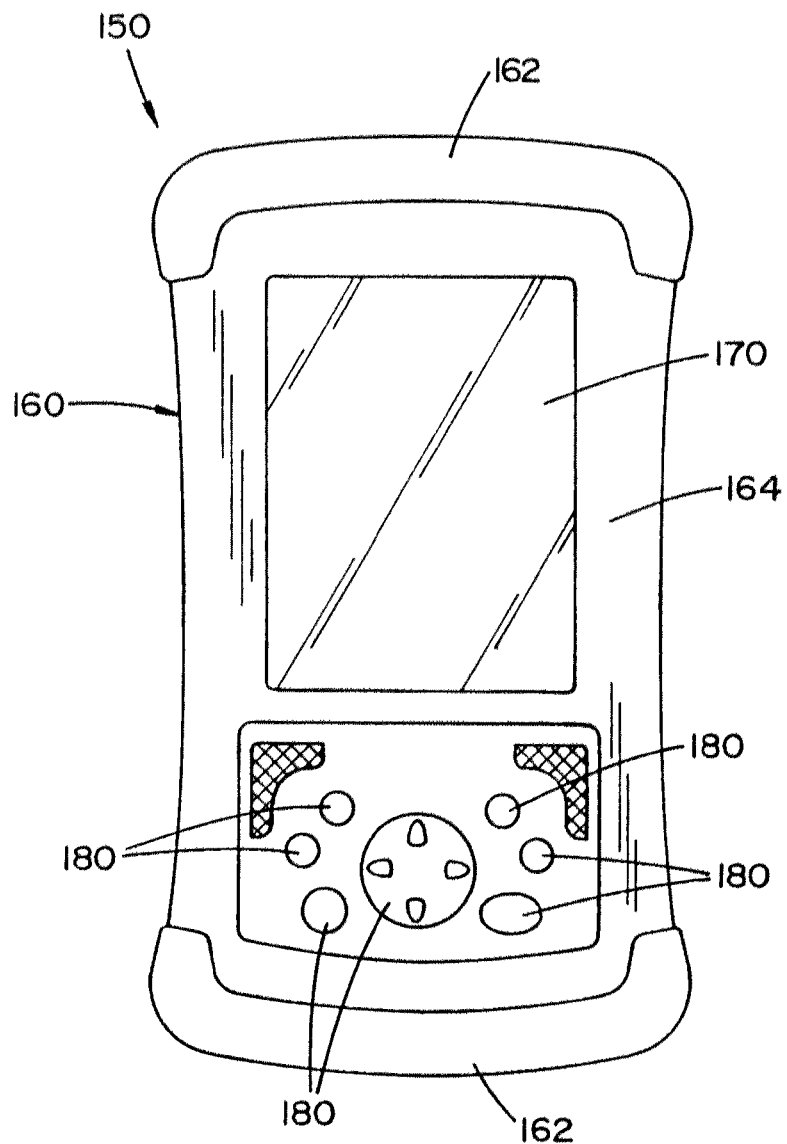
FIG. 3 is a top view of one non-limiting embodiment of a control unit of the portable monitor in accordance with the present invention.

Referring now to FIGS. 2-5, there are illustrated two non-limiting arrangements for portable monitor 100 in accordance with the present invention. Referring now to FIGS. 2 and 3, the portable monitor includes a measuring unit 110 and a control unit 150. The portable monitor is designed to obtain various types of information from a plurality of different wells 20 so that the proper flowrate of landfill gas drawn into the wells from one or more landfills 10 can be obtained. FIG. 1 illustrates only one type of well that the portable monitor can be temporarily connected to obtain information from the well. As can be appreciated, the portable monitor of the present invention can be connected to other types of landfill wells. The information that the portable monitor of the present invention can obtain from well 20 includes, but not limited to, flowrate of landfill gas into the well, composition of the landfill gas flowing into the well, temperature of the landfill gas flowing into the well, LEL and/or UEL of the landfill gas being drawn into the well, differential pressure of the well, static pressure of the well and/or available vacuum pressure for the well.

Referring now to FIG. 2, the measuring unit 110 of the portable monitor 100 is a relatively small and light unit. The measuring unit typically has a weight of less than about 5 lbs, and a total volume of less than about 200 cubic inches. The housing 112 of the measuring unit is made of a durable material that protects the internal components of the measuring unit from damage. The measuring unit is designed to be used in a wide variety of environments. The measuring unit typically has an Ingress Protection Rating of at least IP67. The measuring unit is typically designed to operate in temperatures as low as about −20° F., and as high as about 120° F. The housing of the measuring unit can include one or more slots and/or connectors, not shown, to facilitate in removably connecting the housing to a well structure or the like so that the measuring unit can be conveniently mounted in a temporary fashion during the testing of the landfill well; however, this is not required.

On the top face of housing 112 is a heat power button/indicator 114, a unit power button/indicator 116, and a battery life indicator 118. The unit power button/indicator 116 is used to manually power on or off the measuring unit. The unit power button/indicator includes an indicator light to indicate when the measuring unit is powered on or off. The heat power button/indicator 114 is used to manually power on or off the heating system for the measuring unit. The heat power button/indicator includes an indicator light to indicate when the heating system is powered on or off. When the heat power button/indicator is activated, one or more heating elements in the measuring unit supply heat to one or more regions of the measuring unit. In colder temperatures, the operation of one of more components in the measuring unit can be impaired, thus resulting in slow or unreliable measurements from the landfill well. The one or more heating elements in the measuring device are designed to maintain the temperature of one or more internal components in the measuring device above a certain temperature. The battery life indicator 118 indicates the remaining charge of the rechargeable battery in the measuring unit.

On the sides of housing 112 are several coupler ports 120, 122, 124, 126. Coupler port 120 is the static pressure port and is design to be connected to a vacuum tube or fluid coupling device 130 which in turn is connected to pressure port 44 of inlet pipe 40 as illustrated in FIG. 1. Coupler port 122 is the impact pressure port and is design to be connected to a vacuum tube or fluid coupling device 132 which in turn is connected to pressure port 42 of inlet pipe 40 as illustrated in FIG. 1. Coupler port 126 is the available pressure port and is designed to be connected to a vacuum tube or fluid coupling device 134 which in turn is connected to pressure port 62 of coupler pipe 60 as illustrated in FIG. 1. Coupler port 124 is a temperature port that is designed to connect to a temperature probe wire 136 which in turn is connected to a temperature probe located in opening 46 of inlet pipe 40 as illustrated in FIG. 1. The side of housing 112 also includes an exhaust port 128 that is used to expel the analyzed landfill gas from the measuring unit.

The measuring unit 110 is designed to use information received from coupler ports 120, 122 and 126 to determine the differential pressure of the well, static pressure of the well and available vacuum pressure for the well. Coupler port 124 is used by the measuring unit to determine the temperature of the landfill gas that is flowing into pipe 40. The portable monitor can use these measurements from the measuring unit to calculate the flow rate of landfill gas into pipe 40. The measuring unit can include a single pressure sensor or a plurality of pressure sensors to measure the well pressures. In one non-limiting arrangement, the measuring unit includes three pressure sensors to enable the measuring unit to simultaneously measure the differential pressure of the well, static pressure of the well and/or available vacuum pressure for the well.

In the inside of housing 112, there is provided a plurality of chemical analyzers used to identify and/or measure the concentration of one or more components of the landfill gas. In particular, the measuring unit includes chemical analyzers to measure the concentration of methane, carbon dioxide and oxygen in the landfill gas. In one non-limiting arrangement, the measuring unit includes a separate chemical analyzer to identify the presence and/or to calculate and/or measure the concentration of methane, a separate chemical analyzer to identify the presence and/or to calculate and/or measure the concentration of carbon dioxide, and a separate chemical analyzer to identify the presence and/or to calculate and/or measure the concentration of oxygen. As can be appreciated, the measuring unit can include more than three chemical analyzers when more than three different gasses are to be identified and/or measured or calculated. For example, the measuring unit can include a fourth chemical analyzer to identify the presence and/or to calculate and/or measure the concentration of carbon monoxide, hydrogen sulfide or nitrogen. As can be appreciated, other or additional gasses can be identified and/or measured by the measuring unit. Generally, for each gas to be identified and/or measured or calculated, the measuring unit includes a separate chemical analyzer for such gas. The chemical analyzer for the methane and carbon dioxide is typically an IR measuring cell, and the chemical analyzer for oxygen is typically a galvanic cell; however, this is not required. The measuring unit includes one or more pumps to draw the landfill gas into one or more coupler ports 120, 122, 126, and/or expel the landfill gas through exhaust port 128. In addition to the identifying and/or measuring the concentration of components of the landfill gas, the portable monitor can be used to measure the lower explosive limit (LEL) and/or upper explosive limit (UEL) of the landfill gas. The measuring unit includes one or more circuits and/or microprocessors to operate one or more software and/or hardware programs in the measuring unit, and/or one or more components in the measuring unit (e.g., calibration hardware/software, flowrate calculation hardware/software, BTU calculation software, gas analysis hardware/software, communication hardware/software, mode of operation hardware/software, pump, chemical analyzer, temperature detector, heating pad, thermocouple, etc.). The measuring unit can include one or more connection ports. As illustrated in FIG. 1, there is provided a communication cable 140 that can be used to connect the measuring unit 110 to the control unit 150 to enable data transfer between the two units. This cable connection arrangement between the measuring unit and the control unit is an optional arrangement. The measuring unit can also include cable connection arrangements to connect to other types of devices (e.g., computer, phone, internet, printer, data storage, etc.). The measuring unit also includes wireless communication hardware to enable the measuring unit to communicate wirelessly with the control unit.

Referring now to FIGS. 1 and 3, there is illustrated the control unit 150 of the portable monitor 100. The control unit is a portable handheld device that is used to a) at least partially control the operation of measuring unit 110; b) to obtain information, process information obtained/measured by the measuring unit 110, and/or c) monitor the operation of the measuring unit 100. As can be appreciated, the control unit can have other or additional uses. The communication between control unit 150 and measuring unit 110 is typically wireless; however, a cable connection using cable 140 as illustrated in FIG. 1 can be optionally used to connect together the control unit and the measuring unit.

The control unit is typically sized and configured like a typical PDA device, Palm PC device or BLACKBERRY device; however, the control unit can be sized and configured in other ways. In one non-limiting configuration, the control unit is a customized TRIMBLE RECON handheld device. These types of devices are desirable due to their small, lightweight and rugged design. The control unit is designed to be used in a wide variety of environments. Like the measuring unit, the control unit typically has an Ingress Protection Rating of at least IP67 so that the control unit can be safely used in rainy conditions, snowy conditions, sunny conditions, dusty condition, etc. The control unit is also typically designed to properly operate in temperature at least as low as about 0° F., and at least as high as about 120° F. The control unit typically has a weight and size that is less than the measuring unit. Typically, the control unit has a weight of less than about 1.5 lbs, and a volume of less than about 50 cubic inches.

As best illustrated in FIG. 3, the control unit 150 includes a housing 160 that is formed of a durable material such as, but not limited to, plastic, metal, etc. Located at the top and bottom of the housing are cushioning elements 162 designed to protect the housing and internal components of the control unit when the control unit is inadvertently dropped on the ground. The top face 164 of the housing includes a opening for viewing a LCD display screen 170. The LCD display may be a black and white or a color display. The display enables an operator to view various types of information. The display may also include touch screen features to enable an operator to enter information into the control unit and/or access information from the control unit. A stylus pen or the like, not shown, may be used with the touch screen features of the display to facilitate in the operation of the control unit. The top face of the control unit also includes several buttons 180 that are used to operate one or more functions/features of the control unit (e.g., power on/off button, cursor button, function button, enter button, delete button, etc.). The control unit may also include a display protector, not shown, that is removably fitted over the display panel to protect the display panel from damage; however, this is not required. The control unit can also include a hand strap and/or clip connector to facilitate in the carrying of the control unit; however, this is not required.

The control unit includes one or more circuits and/or microprocessors to operate one or more software and/or hardware programs that are loaded in the control unit. For example, the control unit may include one or more Intel or AMD processors in combination with various amounts of data storage memory. An operating system such as Microsoft Windows Mobile software or the like can be loaded in the control unit. Various other types of software can be loaded in the control unit to enhance the features/operation of the control unit. Such software can include, but is not limited to, G.P.S. software, navigation software, wireless communication software, photograph/video software, sound/music software, sound recording software, file/data transfer software, internet browser software, wordprocessor software, touch screen software, database software, spreadsheet software, email software, calendar software, address book software, security software, data management software, and the like. The control unit also includes software that is used to calibrate, diagnose problems, control and/or monitor the measuring unit, and/or to receive and/or transmit information between the control unit and measuring unit. The control unit may also include software to process the information received from the measuring unit to provide additional information about the landfill well. The control unit also includes wireless technology to transfer information between the control unit and the measuring unit e.g., 802.11 wireless technology, Blue tooth technology, IR technology, etc.). The control unit can include other optional components such as, but not limited to, camera, microphone, speaker, indicators (e.g., battery level indicator, on/off indicator, etc.), power pack compartment that is used to store one or more rechargeable energy cells, one or more connection ports (e.g., fire wire, USB, serial cable, phone cable, ethernet cable, etc.), one or more expansion slots (e.g., Type1 and/or Type II expansion slots), etc.

In operation, the control unit can be used to control most, if not all, of the operations of the measuring unit once the measuring unit has been connected to the landfill well. As such, an operator is able to remotely monitor and/or control the measuring unit. This is a significant improvement over prior art portable monitors wherein the operator had to be positioned next to the single portable monitor in order to monitor the operation of the single portable monitor, control the operation of the single portable monitor, and to take measurements from the single portable monitor.

Figure 4:
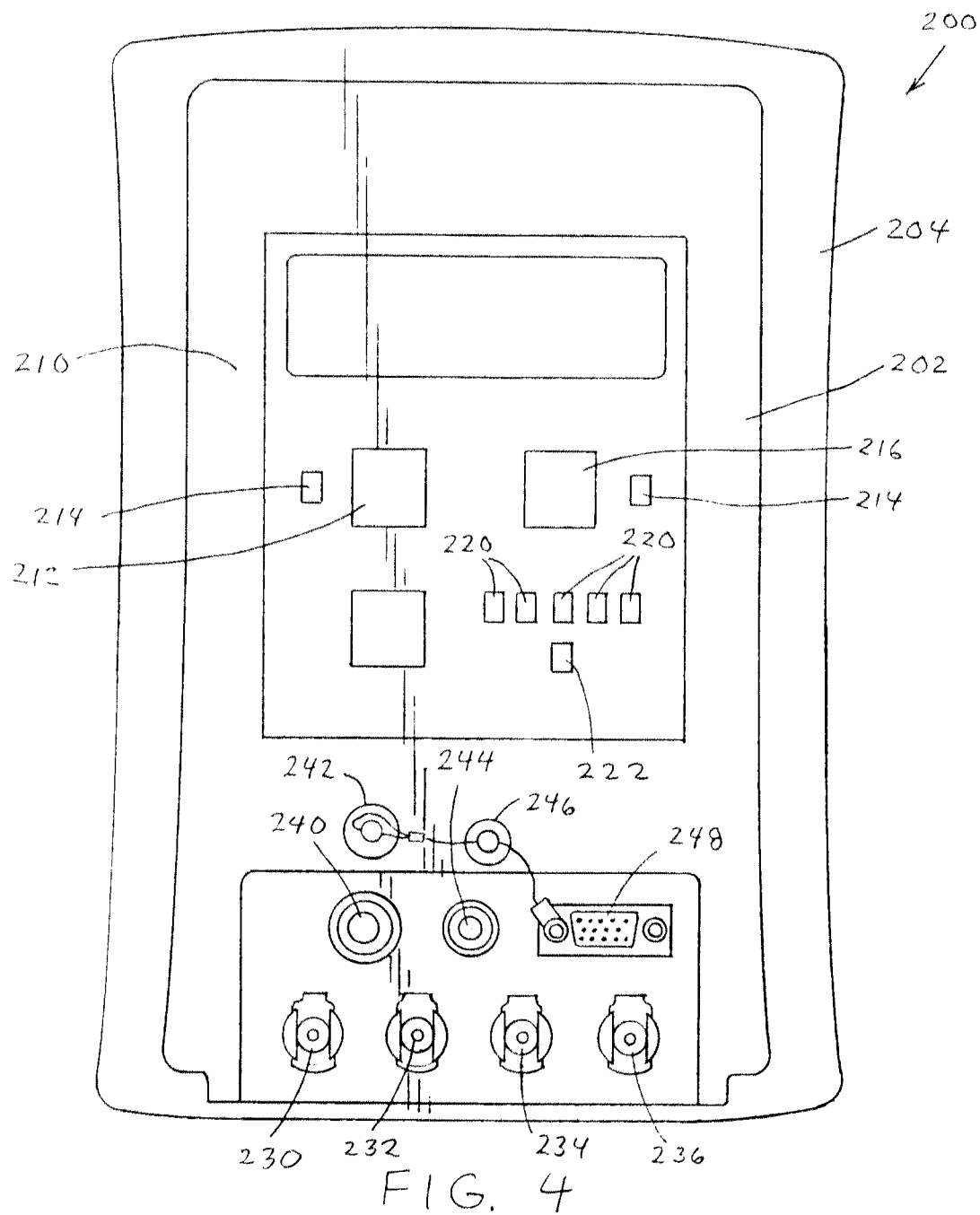
FIG. 4 is a top view of another non-limiting embodiment of a measuring unit of the portable monitor in accordance with the present invention; and, FIG. 5 is a top view of another non-limiting embodiment of a control unit of the portable monitor in accordance with the present invention.

Referring now to FIG. 4, another non-limiting embodiment of the measuring unit 200 of the portable monitor 100 is illustrated. The measuring unit is a relatively small and light unit. The measuring unit typically has a weight of less than about 5 lbs, and a total volume of less than about 200 cubic inches. The housing 202 of the measuring unit is made of a durable material that protects the internal components of the measuring unit from damage. A protective material 204 can be positioned about all or a portion of the top, bottom and side edges of the housing so as to provide additional protection to the housing; however, this is not required. The protective material can be formed of rubber, plastic, foam, etc. Generally the protective material is a durable material and a flexible material that can absorb a force that is applied to the housing such as an object bumping into the housing or the measuring unit being dropped on the ground. The measuring unit is designed to be used in a wide variety of environments. The measuring unit typically has an Ingress Protection Rating of at least IP67. The measuring unit is typically designed to operate in temperatures as low as about −20° F., and as high as about 120° F. The housing of the measuring unit can include one or more slots and/or connectors, not shown, to facilitate in removably connecting the housing to a well structure or the like so that the measuring unit can be conveniently mounted in a temporary fashion during the testing the landfill well; however, this is not required.

The top face 210 of housing 202 includes several buttons, light indicators, ports, etc. As can be appreciated, the location of one or more buttons, light indicators, ports, etc. on the housing is non-limiting. As illustrated in FIG. 4, the front or top face of the housing includes a power button 212. An LED light 214 is positioned next to the power button; however, this is not required. The LED light can be used to indicate whether the power to the measuring unit has been activated or deactivated. The front or top face of the housing includes a Bluetooth button 216. An LED light 214 is positioned next to the Bluetooth button; however, this is not required. The LED light can be used to indicate whether the Bluetooth feature has been activated or deactivated, and/or can be used to indicate whether a Bluetooth connection has been established. The front or top face of the housing includes several LED lights 220 which are used to indicate the power level of the power source for the measuring unit. The LED lights can be different colored lights to indicate different power levels; however, this is not required. The front or top face of the housing includes an LED light 222 to indicate whether the power source of the measuring unit is being charged; however, this is not required. As can be appreciated, one or more of the above mentioned buttons and/or lights can be replaced by a screen and/or touch screen arrangement. When a screen and/or a touch screen is used, additional features can be accessed and/or displayed on such screen and/or touch screen arrangement (e.g., status of one or more pressure sensors, status of one or more pumps, status of one or more chemical analyzers, status of one or more heating pads, status of one or more thermocouples, status of data transfer between the measuring unit and control unit or some other unit, exterior temperature, temperature of one or more components in the housing, temperature in the housing, malfunction or error status, testing status, information about components in the measuring unit, information about software used in the measuring unit, power level status, Bluetooth status, GPS information, etc.). As can be appreciated, one or more types of information listed above and/or other types of information can be alternatively or additionally sent to the control unit for display on the control unit; however, this is not required.

The bottom portion of the front or top face of the housing includes four gas/liquid ports 230, 232, 234, 236. Port 230 is an exhaust port and is used to exhaust gasses/liquids that were previously drawn into the measuring unit via ports 232, 234 and/or 236. Port 232 is a port that is to be connected to the well via a tube so as to measure the available (system) vacuum that is being applied to the well. Port 234 is port that is to be connected to the ell via a tube so as to measure the differential pressure on the well. This port is also referred to as the impact port. Port 236 is a port that is to be connected to the well via a tube so as to measure the static wellhead pressure of the well. Ports 232, 234 and/or 236 can also be used to calibrate one or more components in the measuring unit (e.g., pressure sensors, chemical analyzers, etc.) and/or be used to draw samples of gas/liquid from the well into the measuring unit; however, this is not required. In one non-limiting arrangement, port 236 is also used to receive calibration gas and to receive gas/liquid samples from the well. As can be appreciated, the measuring unit can include additional ports (e.g., sample port, calibration port, etc.).

The bottom portion of the front or top face of the housing includes a charge port 240 that is used to charge the power source in the measuring unit. A removable cap 242 is used to protect the charge port. The bottom portion of the front or top face of the housing includes a thermistor port 244 and a cap 246. The thermistor port houses a resistor that prevents overheating or other types of damage to the electrical components in the measuring unit. The bottom portion of the front or top face of the housing includes a communication port 248 (e.g., USB port, serial port, firewire port, etc.) that can be used to connect a commination cable to the measuring unit so that data can be transferred from and/or to the measuring unit. As illustrated in FIG. 4, the communication port is in the from of a serial port; however, this is not required. As can be appreciated, data to and/or from the measuring unit can be transferred/received wirelessly; however, this is not required.

The measuring unit includes at least three chemical analyzers to identify and measure the amount of methane, oxygen and carbon dioxide in the fluid being drawn from the landfill well. The measuring unit includes two infrared gas analyzers, one each to identify and measure methane and carbon dioxide. As such, three different gasses can be simultaneously identified and/or measured by the measuring unit of the present invention. The measuring unit includes one electrochemical gas analyzer to identify and measure oxygen. As can be appreciated, different types of gas analyzers can be used to identify and measure the methane, carbon dioxide and oxygen in the fluid stream flowing through the landfill well; however, this is not required. As can also be appreciated, one or more additional chemical analyzers can be used to identify and measure other gasses in the fluid stream; however, this is not required. If more than three chemical analyzers are included in the measuring unit, then the measuring unit can be used to simultaneously identify and/or measure more than three different gasses. In addition to the identifying and/or measuring the concentration of components of the landfill fluid, the measuring unit and/or control unit can be used to calculate and/or measure the lower explosive limit (LEL) and/or upper explosive limit (UEL) of the landfill fluid.

The measuring unit includes at least three pressure sensors so as to be able to simultaneously measure up to three different pressures on the landfill well. In one non-limiting arrangement, the measuring unit includes more than three pressure sensors (e.g., four, five, six, etc.). The additional pressure sensors can be used to enable the measuring unit to measure more than three different pressure from the landfill well; however, this is not required. Alternatively or additionally, the one or more additional pressure sensors can be used to obtain more accurate pressure readings. For example, the measuring unit can include one or more pressure sensors that are designed for use within a certain pressure range. As such, the measuring unit can include a logic circuit and/or microprocessor to activate/deactivate certain pressure sensors and/or direct fluid to certain pressure sensors based on a detected fluid pressure so that a certain pressure sensor that is designed to accurately measure pressure within a certain pressure range is used to measure the fluid pressure. In one non-limiting arrangement, the measuring unit includes five pressure sensors and at least two pressure sensors are designed to have a preferred pressure measuring range that is different from the preferred pressure measuring range of at least two, and typically three of the other pressure sensors. The measuring unit generally includes a single pump that is used to draw fluid into the measuring unit and expel fluid from the measuring unit. As can be appreciated, the measuring unit can include a plurality of pumps.

The measuring unit includes a plurality of heating elements or pads that are designed to maintain a minimum temperature of the components within the housing of the measuring unit. A plurality of temperature sensors (e.g., thermocouples, etc.) are positioned through the interior of the housing so as to obtain temperature readings in various regions of the housing interior. Generally the temperature sensors are positioned on or near important components in the housing (e.g., pressure sensors, pump, chemical analyzers, microprocessor, etc). The temperature sensors are used to activate/deactivate one or more of the heating elements or pads in the housing. A resistor and/or microprocessor can be used to activate/deactivate one or more of the heating elements or pads. In one non-limiting arrangement, a microprocessor is used to activate/deactivate one or more of the heating elements or pads in the housing based on a low and/or high threshold temperature that is detected by one or more of the temperature sensors. For example, if the microprocessor receives information from one or more of the temperature sensors that a temperature is at or below a certain low threshold temperature, then the microprocessor causes one or more of the heating elements or pads to be activated. If the microprocessor receives information from one or more of the temperature sensors that a temperature is at or above a certain high threshold temperature, then the microprocessor causes one or more of the heating elements or pads to be deactivated. In another non-limiting arrangement, the interior of the housing of the measuring unit includes N number of temperature sensors wherein N is three or more in value. The microprocessor is designed to cause all or a majority of the heating elements or pads in the housing to be activated when the microprocessor receives information from a majority or all of the N number of temperature sensors that a temperature is at or below a certain low threshold temperature. Also, the microprocessor is designed to cause all or a majority of the heating elements or pads in the housing to be deactivated when the microprocessor receives information from a majority or all of the N number of temperature sensors that a temperature is at or above a certain high threshold temperature. The control of the heating pads can be from one or more microprocessors in the measuring unit and/or from one or more microprocessors in the control unit.

The measuring unit includes one or more circuits and/or microprocessors to operate one or more software and/or hardware programs in the measuring unit, and/or one or more components in the measuring unit (e.g., calibration hardware/software, flowrate calculation hardware/software, BTU calculation software, gas analysis hardware/software, communication hardware/software, mode of operation hardware/software, pump, chemical analyzer, temperature detector, heating pad, thermocouple, etc.).

The measuring unit can optionally include one or more filters that are used to inhibit or prevent materials other than fluid from contacting the chemical analyzers and/or pressure sensors. Such foreign material (e.g., dirt, solid particles, etc.) can damage and/or interfere with the proper operation of the chemical analyzers and/or pressure sensors. In one non-limiting arrangement, the measuring unit includes two filters. The filters can be designed to be replaced. The measuring unit can include a display and/or send information to the control unit so as to inform a user when to replace one or more filters; however, this is not required.

Figure 5:
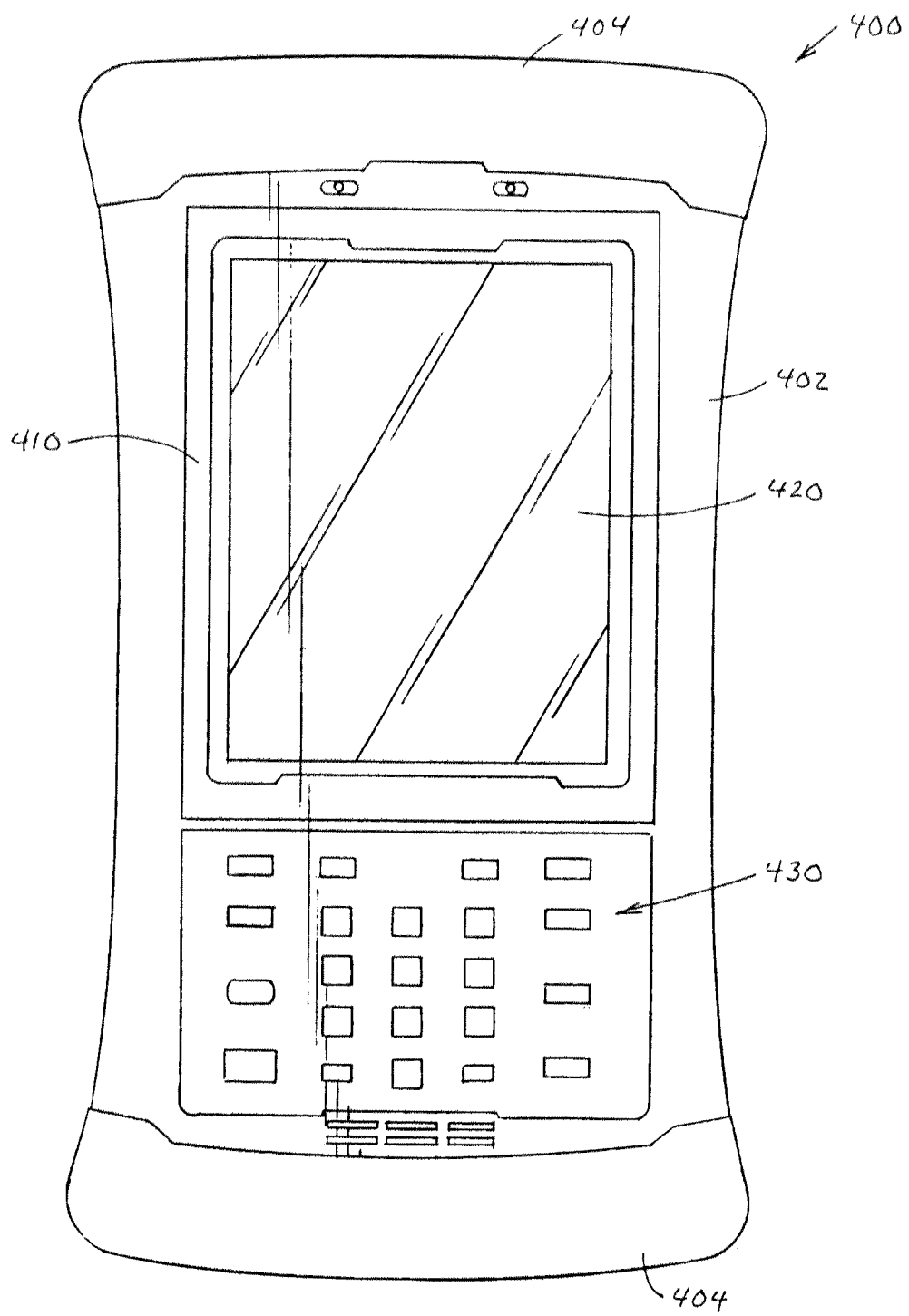

Referring now to FIG. 5, there is illustrated a control unit 400 of the portable monitor 100. The control unit is a portable handheld device that is used to a) at least partially control the operation of measuring unit 200; b) to obtain information, process information obtained/measured by the measuring unit 200, and/or c) monitor the operation of the measuring unit 200. As can be appreciated, the control unit can have other or additional uses. The communication between control unit 400 and measuring unit 200 is typically wireless; however, a cable connection using a cable can be optionally used to connect together the control unit and the measuring unit.

The control unit is typically sized and configured like a typical PDA device, Palm PC device or BLACKBERRY device; however, the control unit can be sized and configured in other ways. In one non-limiting configuration, the control unit is a customized TRIMBLE NOMAD handheld device. These types of devices are desirable due to their small, lightweight and rugged design. The housing 402 of the control unit is made of a durable material that protects the internal components of the control unit from damage. A protective material 404 can be positioned about all or a portion of the top, bottom and side edges of the housing so as to provide additional protection to the housing; however, this is not required. The protective material can be formed of rubber, plastic, foam, etc. Generally the protective material is a durable material and a flexible material that can absorb a force that is applied to the housing such as an object bumping into the housing or the control unit being dropped on the ground. The control unit is designed to be used in a wide variety of environments. The control unit typically has an Ingress Protection Rating of at least IP67. The control unit is typically designed to operate in temperatures as low as about −20° F., and as high as about 140° F. The control unit typically has a weight and size that is less than the measuring unit. Typically, the control unit has a weight of less than about 1.5 lbs, and a volume of less than about 75 cubic inches.

The top face 410 of the housing of the control unit includes a display screen 420 (LED display, VGA display, etc.). The display screen may be a black and white or a color display. The display screen may or may not be a touch screen. The display screen is designed to enable an operator to view various types of information. The display may include touch screen features to enable an operator to a) enter information into the control unit, b) access information from the control unit, c) access information from the measuring unit, and/or d) send information to the measuring unit; however, this is not required. A stylus pen or the like, not shown, may be used with the touch screen features of the display to facilitate in the operation of the control unit; however, this is not required. The top face of the control unit also includes several buttons 430 that are used to operate one or more functions/features of the control unit (e.g., power on/off button, cursor button, function button, enter button, delete button, text buttons, character buttons, numeric buttons, etc.). The control unit may also include a display protector, not shown, that is removably fitted over the display screen to protect the display screen from damage; however, this is not required. The control unit can also include a hand strap and/or clip connector to facilitate in the carrying of the control unit; however, this is not required.

The control unit can also include one or more speakers, microphones, power connectors, communication ports, memory slots, scanners, cameras, and the like; however, this is not required.

The control unit includes one or more circuits and/or microprocessors to operate one or more software and/or hardware programs that are loaded in the control unit. For example, the control unit may include one or more Intel or AMD processors in combination with various amounts of data storage memory. An operating system such as Microsoft Windows Mobile software or the like can be loaded in the control unit. Various other types of software can be loaded in the control unit to enhance the features/operation of the control unit. Such software can include, but is not limited to, G.P.S. software, navigation software, wireless communication software, photograph/video software, sound/music software, sound recording software, file/data transfer software, internet browser software, wordprocessor software, touch screen software, database software, spreadsheet software, email software, calendar software, address book software, security software, data management software, Microsoft Office software, active sync software, address books, clock, calendar, scanning software, camera software, voice recognition software, internet browser, phone software, and the like. The control unit also includes software that is used to 1) calibrate, diagnose problems, control and/or monitor the measuring unit, and/or 2) receive and/or transmit information between the control unit and measuring unit. The control unit may also include software to process the information received from the measuring unit to provide additional information about the landfill well. The control unit also includes wireless technology to transfer information between the control unit and the measuring unit (e.g., 802.11 wireless technology, Bluetooth technology, IR technology, etc.). The control unit can include other optional components such as, but not limited to, camera, microphone, speaker, indicators (e.g., battery level indicator, on/off indicator, etc.), power pack compartment that is used to store one or more rechargeable energy cells, one or more connection ports (e.g., fire wire, USB, serial cable, phone cable, ethernet cable, etc.), one or more expansion slots (e.g., Type1 and/or Type II expansion slots), etc.

In operation, the control unit can be used to control most, if not all, of the operations of the measuring unit once the measuring unit has been connected to the landfill well. As such, an operator is able to remotely monitor and/or control the measuring unit. This is a significant improvement over prior art portable monitors wherein the operator had to be positioned next to the single portable monitor in order to monitor the operation of the single portable monitor, control the operation of the single portable monitor, and to take measurements from the single portable monitor.

The control unit is designed to connect wirelessly to the measuring unit; however, a cable connection can be used. The control unit typically includes GPS hardware and software. The GPS feature can be used to guide a user to a particular landfill and/or to a particular landfill well. The control unit can optionally include a scanner such a bar code reader. The scanner can be used to scan information on a landfill well (e.g., bar code, etc.) so as to verify the identity of a landfill well and/or landfill location. In one application, the scanning of an identity label on a landfill well can enable the control unit to call up past information regarding the landfill well and/or landfill site (e.g., landfill information, past landfill results, notes about landfill, etc.). Also or alternatively, the control unit can include RFID hardware and software to detect and RFID tag on the landfill well and/or landfill site. Similar to the identity label, the RFID tag can enable the control unit to call up past information regarding the landfill well and/or landfill site.

The control unit can include a camera that can be used to take pictures of a landfill well and/or landfill site. Such pictures can be optionally stored in the control unit and be associated with the file for a particular landfill well and/or landfill site.

The control unit can optionally include a cellular modem to enable the control unit to make and receive calls and/or to connect to the internet. The control unit may include one or more connectors that enable the control unit to connect to an ethernet connection for connection to the internet. The cellular and/or internet connection can be used to send and/or receive various types of information (e.g., updates, software fixes, download/upload data between control unit and another device, etc.).

The control unit includes gas analyzer software that is used to 1) process data received from the measuring unit regarding the fluid flow from the well (e.g., fluid composition, etc.), and/or 2) control and/or monitor the operations of the measuring unit.

Generally, for each landfill well that is tested, the control unit requires that the user name be entered, and the date and time the test occurred. This information is stored in the memory of the control unit and is associated with a particular landfill well.

The control unit generally includes calibration software that is used to calibrate the pressure sensors and/or the chemical analyzers in the measuring unit. Generally, the chemical analyzers and pressure sensors should be calibrated prior to each landfill well being tested. A calibration gas is generally used to calibrate one or more of the chemical analyzers in the measuring unit.

The identity of a landfill well that is stored in the control unit can be labeled by at least three different methods, namely, manual inputted information, GPS location, RFID tag or some other identity label. The control unit can include software to search for a landfill well in memory using one or more of these labeling methods.

The control unit generally includes software that creates a display on the display screen to provide information on the progress of the analyzing of the landfill well. Generally the display screen will identify the name or identity of the landfill well and information about the fluid flowing from the well (e.g., well temperature, various pressures from the well, chemical analysis of one or more components of the fluid form the well, LEL, UEL, pump status, etc.). For example, one screen display may provide information about 1) the presence/amount of methane, 2) the presence/amount of carbon dioxide, and 3) the presence/amount of oxygen. The same screen display may optionally provide additional information regarding a) balance amount of other fluid components (e.g., 100%-% methane-% oxygen-% carbon dioxide), b) methane to carbon dioxide ratio, c) balance amount of other fluid components to oxygen ratio, d) well temperature, pump running status, e) available pressure, f) applied pressure, g) differential pressure, and/or h) flow rate of fluid into measuring unit. As can be appreciated, measured values can be presented on more than one screen display. In such a arrangement, the user can toggle between two of more display screen to cause a particular display to show on the display screen. In one specific arrangement, one screen display can include information about 1) the name or identity of the landfill well, 2) the presence/amount of methane, 3) the presence/amount of carbon dioxide, and 4) the presence/amount of oxygen; and another screen display can include information about a) the name or identity of the landfill well, b) the available pressure of the well, c) applied pressure of the well, and d) the differential pressure of the well. Additional screen displays can optionally include information about past test results of the landfill well so that the user can compare present readings to previous readings. Such historical information can be used by the user to adjust the well as required.

The control unit can optionally include software that facilitates in providing warnings to a user and/or identifying information that is not within some predefined acceptable ranges. For example, if a) the LEL and/or UEL levels for a landfill well, b) balance of gas value, c) ratio of balance gas to oxygen value, d) ratio of methane to carbon dioxide value, and/or d) one or more pressure values are equal to or outside some predefined limit, the control unit can cause such values to be displayed in an enhanced manner (e.g., different font, different color, larger font, flashing or blinking value, etc.), display a warning message, and/or cause some audible signal to occur. For instance, when the ratio of balanced gas to oxygen value is near or below 4, such a value can indicate an air leak in a testing hose, in the well and/or the need to recalibrate or replace a chemical analyzer. Also, when the ratio of methane to carbon dioxide is lower than 1.1, such a ratio may indicate that stress conditions exist in the landfill and the fluid flow through the well rate may need to be adjusted. The ratio may also provide information on the different phases of landfill gas production for a particular landfill well. The software used in the control unit can optionally enable a user to set or adjust one or more of the predefined values. Such predefined values can be customized for different landfill wells; however, this is not required.

The control unit can optionally include software that enables the user to provide additional information about a particular landfill well. Such information can include, but is not limited to, name of landfill site, name of landfill well, landfill address, GPS location of landfill site, GPS location of landfill well, bar code information, RFID information, landfill well type (e.g., pitot tube, orifice tube, S pitot tube, etc.), pipe size (e.g., 0.5, 1, 1.5, 2, 3, 4, 6, 8, etc.) and/or plate size (e.g., 0.25, 0.5, 1, 1.24, 1.5, 1.75, etc.).

The control unit can optionally include software to determine if data for one or more landfill wells was not obtained or fully obtained and/or input during a certain predefined testing interval. This feature can be used to ensure that all landfill wells are fully and timely monitored. Many landfill wells are generally not monitored on a daily basis. For such landfills that require constant or daily monitoring, portable monitors are typically not used. Permanent monitoring systems are generally setup for such landfill wells. For landfill wells that only require periodic monitoring (e.g., landfill well that require monitor no more than once a week), a portable monitor in accordance with the present invention is generally used. The portable monitor is designed to be temporarily connected to a landfill well, conduct the landfill well test, disconnected from the landfill well, and then moved to another landfill well to test such well. This testing cycle is repeated to test multiple landfill wells.

The software used by the control unit can be designed to interface with software on another device (e.g., network computer, tablet computer, laptop computer, desktop computer, PDA, etc.) to enable transfer of data between the control unit and such other devices. Such communication can be wireless, cable connection, etc. Sync software on the control unit can optionally be used to facilitate in such communication with other devices.

The software on the control unit can provide the user with various types of warnings (e.g., error codes, visual warnings, audible warnings, etc.) to inform the user that attention may be required during a certain procedure. The software can also optionally provide warning errors to provide the user about the status of one or more components of the portable monitor and/or the manner in which the portable monitor is connected to a landfill well and/or one or more devices. Examples of errors include:

1) Battery Failure—The battery gauge is displaying erroneous battery data, as a result of a charging chip failure. Such a failure may affect battery cut-offs and accurate monitoring.

2) Charging Failure—The charging chip is not shutting off the charging process.

3) Charging Chip Failure—The charging chip is not maintaining a charge rate, which makes the charging process longer.

4) Sensor Failure—The pump, manifold pressure sensor, or either of the two IR sensors have stopped operating correctly and are not drawing any current.

5) Excessive Current Draw—Any number of parts may have failed due to a short or component failure.

6) Pressure Sensor Failure—One of the pressure sensors is reading out of spec, likely due to an overpressure situation (blown sensor).

7) Low Flow Condition—Improper fluid flow to the measuring unit. Check that the sample train hoses are not pinched. Check inline filters and make sure that they are clear and free from debris and liquids.

8) Oxygen Sensor Failure—Oxygen sensor is out of specification. Potentially bad sensor.

9) Over Pressure error—Pressure applied to pressure sensors are higher than sensors a specified for. May need to disconnect hoses from measurement location and recalibrate sensors. Verify that the pressure on the sample point is within the tolerance of the measuring unit.

10) Battery low Error—Battery charge level is low. Recharge battery.

11) Temperature Error—Measurement Unit is too hot or too cold.

12) Connection Error—Control unit did not properly connect to the measuring unit.

13) Connection Lost—Control unit lost connection with the measuring unit.

14) Scanner Initialization Error—The scanner function is not active on the control unit.

15) GPS Error—The GPS function is not active on the control unit or the GPS has not yet connected with the satellites.

16) Failed to find GPS/Barcode match—The GPS function or barcode reader is not active on the control unit.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

I claim:

1. A handheld portable monitor configured for periodic well field testing to enable a user to test a plurality of different landfill wells one at a time and configured for measuring a plurality of properties of fluid flowing in each of the tested landfill wells, said handheld portable monitor configured to enable the user to easily and conveniently carry said handheld portable monitor to a testing site of the landfill well to be tested, said handheld portable monitor having a total weight of less than 20 pounds and a total volume of less than 500 cubic inches, said handheld portable monitor including a plurality of connectors that enable at least a portion of said handheld portable monitor to be removably connected to the landfill well to be tested and then disconnected from the tested landfill well and then later connected to another landfill well to be tested, said handheld portable monitor including a sensor arrangement to obtain and to measure said plurality of properties of said fluid flowing in the tested landfill well, said sensor arrangement including at least one pressure sensor and at least one chemical analyzer, said handheld portable monitor including a heating system to heat at least one component of said sensor arrangement of said handheld portable monitor selected from the group consisting of said at least one pressure sensor and said at least one chemical analyzer, said plurality of properties of said fluid flowing in the tested landfill well to be measured including two or more properties selected from the group consisting of well pressure, well temperature, LEL, UEL, well fluid composition, and composition ratio, said heating system including a microprocessor, a thermocouple and a heating element, said microprocessor activating said heating element when said microprocessor obtains information from said thermocouple that a temperature detected by said thermocouple is at or below a predefined low level temperature, wherein said handheld portable monitor includes G.P.S. software and hardware for obtaining G.P.S. coordinates for the tested landfill well.

2. The handheld portable monitor as defined in claim 1, wherein said microprocessor deactivates said heating element when said microprocessor obtains information from said thermocouple that a temperature detected by said thermocouple is at or above a predefined high level temperature.

3. The handheld portable monitor as defined in claim 1, wherein said heating system includes at least three of said thermocouples, said microprocessor activating said heating element when said microprocessor obtains information from a majority of said thermocouples that a temperature detected by said majority of said thermocouples is at or below a predefined low level temperature.

4. The handheld portable monitor as defined in claim 3, wherein said microprocessor deactivates said heating element when said microprocessor obtains information from said majority of said thermocouples that a temperature detected by a majority of said thermocouples is at or above a predefined high level temperature.

5. The handheld portable monitor as defined in claim 1, wherein said handheld portable monitor consists only of two separate units selected from the group consisting of a handheld portable control unit and a handheld portable measuring unit, said handheld portable control unit monitors and controls one or more functions of said handheld portable measuring unit, said handheld portable measuring unit configured to be removably connected to the tested landfill well during testing of the tested landfill well, said handheld portable measuring unit including a measuring unit housing, said measuring unit housing at least partially containing said at least one pressure sensor and said at least one chemical analyzer, said measuring unit housing including said plurality of connectors, said handheld portable control unit configured to be physically disconnected from the landfill well during testing of the landfill well, said handheld portable measuring unit having a weight of less than 10 pounds and has a volume of less than 300 cubic inches, said handheld portable control unit having a weight of less than 5 pounds and has a volume of less than 100 cubic inches, said handheld portable measuring unit including said at least one pressure sensor, said handheld portable control unit absent said at least one pressure sensor.

6. The handheld portable monitor as defined in claim 1, wherein said handheld portable monitor includes a RFID detection system or a barcode scanning system.

7. The handheld portable monitor as defined in claim 5, wherein said handheld portable measuring unit includes a processor that processes information to generate one or more results from the processed information which results are selected from the group consisting of LEL of fluid, UEL of fluid, concentration ratio of methane to carbon dioxide, and concentration ratio of balance gas to oxygen.

8. The handheld portable monitor as defined in claim 2, wherein said handheld portable monitor consists only of two separate units selected from the group consisting of a handheld portable control unit and a handheld portable measuring unit, said handheld portable control unit monitors and controls one or more functions of said handheld portable measuring unit, said handheld portable measuring unit configured to be removably connected to the tested landfill well during testing of the tested landfill well, said handheld portable measuring unit including a measuring unit housing, said measuring unit housing at least partially containing said at least one pressure sensor and said at least one chemical analyzer, said measuring unit housing including said plurality of connectors, said handheld portable control unit configured to be physically disconnected from the landfill well during testing of the landfill well, said handheld portable measuring unit having a weight of less than 10 pounds and has a volume of less than 300 cubic inches, said handheld portable control unit having a weight of less than 5 pounds and has a volume of less than 100 cubic inches, said handheld portable measuring unit including said at least one pressure sensor, said handheld portable control unit absent said at least one pressure sensor.

9. The handheld portable monitor as defined in claim 4, wherein said handheld portable monitor consists only of two separate units selected from the group consisting of a handheld portable control unit and a handheld portable measuring unit, said handheld portable control unit monitors and controls one or more functions of said handheld portable measuring unit, said handheld portable measuring unit configured to be removably connected to the tested landfill well during testing of the tested landfill well, said handheld portable measuring unit including a measuring unit housing, said measuring unit housing at least partially containing said at least one pressure sensor and said at least one chemical analyzer, said measuring unit housing including said plurality of connectors, said handheld portable control unit configured to be physically disconnected from the landfill well during testing of the landfill well, said handheld portable measuring unit having a weight of less than 10 pounds and has a volume of less than 300 cubic inches, said handheld portable control unit having a weight of less than 5 pounds and has a volume of less than 100 cubic inches, said handheld portable measuring unit including said at least one pressure sensor, said handheld portable control unit absent said at least one pressure sensor.

10. The handheld portable monitor as defined in claim 8, wherein said handheld portable monitor includes a G.P.S. system, a RFID detection system, barcode scanning system or combinations thereof, said G.P.S. system including G.P.S. software and hardware for obtaining G.P.S. coordinates for the tested landfill well.

11. The handheld portable monitor as defined in claim 9, wherein said handheld portable monitor includes a G.P.S. system, a RFID detection system, barcode scanning system or combinations thereof, said G.P.S. system including G.P.S. software and hardware for obtaining G.P.S. coordinates for the tested landfill well.

12. The handheld portable monitor as defined in claim 7, wherein said handheld portable monitor includes a G.P.S. system, a RFID detection system, barcode scanning system or combinations thereof, said G.P.S. system including G.P.S. software and hardware for obtaining G.P.S. coordinates for the tested landfill well.

13. The handheld portable monitor as defined in claim 10, wherein said handheld portable monitor includes a G.P.S. system, a RFID detection system, barcode scanning system or combinations thereof, said G.P.S. system including G.P.S. software and hardware for obtaining G.P.S. coordinates for the tested landfill well.

14. The handheld portable monitor as defined in claim 11, wherein said handheld portable monitor includes a G.P.S. system, a RFID detection system, barcode scanning system or combinations thereof, said G.P.S. system including G.P.S. software and hardware for obtaining G.P.S. coordinates for the tested landfill well.

15. The handheld portable monitor as defined in claim 12, wherein said handheld portable monitor includes a G.P.S. system, a RFID detection system, barcode scanning system or combinations thereof, said G.P.S. system including G.P.S. software and hardware for obtaining G.P.S. coordinates for the tested landfill well.

16. The handheld portable monitor as defined in claim 13, wherein said handheld portable measuring unit includes a processor that processes information to generate one or more results from the processed information which results are selected from the group consisting of LEL of fluid, UEL of fluid, concentration ratio of methane to carbon dioxide, and concentration ratio of balance gas to oxygen.

17. The handheld portable monitor as defined in claim 14, wherein said handheld portable measuring unit includes a processor that processes information to generate one or more results from the processed information which results are selected from the group consisting of LEL of fluid, UEL of fluid, concentration ratio of methane to carbon dioxide, and concentration ratio of balance gas to oxygen.

18. The handheld portable monitor as defined in claim 16, wherein said handheld portable monitor includes a RFID detection system or a barcode scanning system.

19. The handheld portable monitor as defined in claim 17, wherein said handheld portable monitor includes a RFID detection system or a barcode scanning system.

20. The handheld portable monitor as defined in claim 15, wherein said handheld portable monitor includes a RFID detection system or a barcode scanning system.

21. A handheld portable monitor configured for periodic well field testing to enable a user to test a plurality of different landfill wells one at a time and configured for measuring a plurality of properties of fluid flowing in each of the tested landfill wells, said handheld portable monitor configured to enable a the user to easily and conveniently carry said handheld portable monitor to a testing site of the landfill well to be tested, said handheld portable monitor having a total weight of less than 20 pounds and a total volume of less than 500 cubic inches, said handheld portable monitor including a plurality of connectors that enable at least a portion of said handheld portable monitor to be removably connected to the landfill well to be tested and then disconnected from the tested landfill well and then later connected to another landfill well to be tested, said handheld portable monitor including a sensor arrangement to obtain and to measure said plurality of properties of said fluid flowing in the tested landfill well, said sensor arrangement including at least one pressure sensor and at least one chemical analyzer, said plurality of properties of said fluid flowing in the tested landfill well to be measured including two or more properties selected from the group consisting of well pressure, well temperature, LEL, UEL, well fluid composition, and composition ratio, said handheld portable monitor includes G.P.S. software and hardware for obtaining G.P.S. coordinates for the tested landfill well to be tested or that has been tested, said handheld portable monitor includes a processor that processes information to generate one or more results from the processed information which results are selected from the group consisting of LEL of fluid, UEL of fluid, concentration ratio of methane to carbon dioxide, and concentration ratio of balance gas to oxygen, a microprocessor of said sensor arrangement in said handheld portable monitor configured to receive information and is configured to process such information and to generate one or more types of information that is selected from the group consisting of said LEL of fluid, said UEL of fluid, said concentration ratio of methane to carbon dioxide, said concentration ratio of balance gas to oxygen, and a LEL value for one or more components in said landfill gas.

22. The handheld portable monitor as defined in claim 21, wherein said handheld portable monitor consists only of two separate units selected from the group consisting of a handheld portable control unit and a handheld portable measuring unit, said handheld portable control unit monitors and controls one or more functions of said handheld portable measuring unit, said handheld portable measuring unit configured to be removably connected to the tested landfill well, said handheld portable control unit configured to be physically disconnected from the landfill well during testing of the landfill well, said handheld portable measuring unit including a measuring unit housing, said measuring unit housing at least partially containing said at least one pressure sensor, said at least one chemical analyzer, said measuring unit housing including said plurality of connectors, said handheld portable control unit is a tablet PC, a palm PC, a PDA, or a smartphone device, said handheld portable measuring unit having a size, shape and weight that enables a the user to easily and conveniently carry said handheld portable measuring unit to the tested landfill well, said handheld portable measuring unit having a weight of less than 10 pounds and has a volume of less than 300 cubic inches, said handheld portable control unit having a weight of less than 5 pounds and has a volume of less than 100 cubic inches, said handheld portable measuring unit including said at least one pressure sensor, said handheld portable control unit absent said at least one pressure sensor.

23. The handheld portable monitor as defined in claim 22, said sensor arrangement in said handheld portable monitor includes one or more components selected from the group consisting of three pressure sensors and three chemical analyzers, said sensor arrangement including a controller arrangement, each of said pressure sensors is configured to measure a different pressure, said controller arrangement used to control each of said pressure sensors to enable said handheld portable monitor to simultaneously measure three different fluid pressures from the tested landfill well, each of said chemical analyzers configured to measure a concentration of a component in said fluid from the tested landfill well, said chemical analyzers configured to measure a concentration of methane, carbon dioxide and oxygen in said fluid from the tested landfill well, said pressures including an applied vacuum on the tested landfill well, a differential vacuum on the tested landfill well, and an available vacuum.

24. The handheld portable monitor as defined in claim 22, wherein said handheld portable monitor includes a heating system to heat one or more components of said sensor arrangement of said handheld portable monitor, said heating system including a microprocessor, a thermocouple and a heating element, said microprocessor activating said heating element when said microprocessor obtains information from said thermocouple that a temperature detected by said thermocouple is at or below a predefined low level temperature.

25. The handheld portable monitor as defined in claim 24, wherein said microprocessor deactivates said heating element when said microprocessor obtains information from said thermocouple that a temperature detected by said thermocouple is at or above a predefined high level temperature, said heating system includes at least three of said thermocouples, said microprocessor activating said heating element when said microprocessor obtains information from said majority of said thermocouples that a temperature detected by said majority of said thermocouple is at or below a predefined low level temperature.

26. The handheld portable monitor as defined in claim 23, wherein said handheld portable monitor includes a heating system to heat one or more components of said sensor arrangement of said handheld portable monitor, said heating system including a microprocessor, a thermocouple and a heating element, said microprocessor activating said heating element when said microprocessor obtains information from said thermocouple that a temperature detected by said thermocouple is at or below a predefined low level temperature.

27. The handheld portable monitor as defined in claim 26, wherein said microprocessor deactivates said heating element when said microprocessor obtains information from said thermocouple that a temperature detected by said thermocouple is at or above a predefined high level temperature, said heating system includes at least three of said thermocouples, said microprocessor activating said heating element when said microprocessor obtains information from said majority of said thermocouples that a temperature detected by said majority of said thermocouples is at or below a predefined low level temperature.

28. A handheld portable monitor configured for periodic well field testing of a plurality of different landfill wells and configured for measuring a plurality of properties of fluid flowing in the tested landfill wells, said handheld portable monitor including a plurality of connectors that enable at least a portion of said handheld portable monitor to be removably connected to the landfill well to be tested and then disconnected from the tested landfill well and then later connected to another landfill well to be tested, said handheld portable monitor configured to enable a user to easily and conveniently carry said handheld portable monitor to a testing site of the landfill well to be tested, said handheld portable monitor having a total weight of less than 20 pounds and a total volume of less than 500 cubic inches, said handheld portable monitor including a sensor arrangement to obtain and to measure said plurality of properties of said fluid flowing in the tested landfill well, said sensor arrangement including at least one pressure sensor and said at least one chemical analyzer, said plurality of properties of said fluid flowing in the tested landfill well including two or more properties selected from the group consisting of well pressure, well temperature, LEL, UEL, well fluid composition, and composition ratio, said handheld portable monitor includes G.P.S. software and hardware for obtaining G.P.S. coordinates for the tested landfill well to be tested or that has been tested, said handheld portable monitor consisting only of a handheld portable control unit and a separate handheld portable measuring unit, said handheld portable control unit monitors and controls one or more functions of said handheld portable measuring unit, said handheld portable measuring unit configured to be removably connected to the tested landfill well, said handheld portable control unit configured to be physically disconnected from the landfill well during testing of the landfill well, said handheld portable measuring unit including said at least one pressure sensor, said at least one chemical analyzer, and said plurality of connectors, said handheld portable control unit is a tablet PC, a palm PC, a PDA, or a smartphone device, said handheld portable measuring unit having a size, shape and weight that enables a user to easily and conveniently carry said handheld portable measuring unit to the tested landfill well, said handheld portable measuring unit having a weight of less than 10 pounds and has a volume of less than 300 cubic inches, said handheld portable control unit having a weight of less than 5 pounds and has a volume of less than 100 cubic inches, said handheld portable measuring unit including said at least one pressure sensor, said handheld portable control unit absent said at least one pressure sensor.

29. The handheld portable monitor as defined in claim 28, wherein said handheld portable measuring unit includes a processor that processes information to generate a plurality of results from the processed information which results are selected from the group consisting of LEL of fluid, UEL of fluid, concentration ratio of methane to carbon dioxide, and concentration ratio of balance gas to oxygen, a microprocessor of said sensor arrangement in said handheld portable measuring unit configured to receive information and is configured to process such information and to generate a plurality of information, said plurality of information includes information that is selected from the group consisting of said LEL of fluid, said UEL of fluid, said concentration ratio of methane to carbon dioxide, said concentration ratio of balance gas to oxygen, and a LEL value for one or more components in said landfill gas.

30. The handheld portable monitor as defined in claim 29, said sensor arrangement in said handheld portable measuring unit includes one or more components selected from the group consisting of three pressure sensors and three chemical analyzers, said sensor arrangement including a controller arrangement, each of said pressure sensors is configured to measure a different pressure, said controller arrangement used to control each of said pressure sensors to enable said handheld portable monitor to simultaneously measure three different fluid pressures from the tested landfill well, each of said chemical analyzers configured to measure a concentration of a different component in said fluid from the tested landfill well, said chemical analyzers configured to measure a concentration of methane, carbon dioxide and oxygen in said fluid from the tested landfill well, said controller arrangement used to control each of said chemical analyzers to enable said handheld portable monitor to simultaneously measure three different components in said fluid from the tested landfill well, said pressures including an applied vacuum on the tested landfill well, a differential vacuum on the tested landfill well, and an available vacuum.

31. The handheld portable monitor as defined in claim 30, wherein said handheld portable monitor includes a heating system to heat one or more components of said sensor arrangement of said handheld portable monitor, said heating system including a microprocessor, a thermocouple and a heating element, said microprocessor activating said heating element when said microprocessor obtains information from said thermocouple that a temperature detected by said thermocouple is at or below a predefined low level temperature.

32. The handheld portable monitor as defined in claim 31, wherein said microprocessor deactivates said heating element when said microprocessor obtains information from said thermocouple that a temperature detected by said thermocouple is at or above a predefined high level temperature, said heating system includes at least three of said thermocouples, said microprocessor activating said heating element when said microprocessor obtains information from said majority of said thermocouples that a temperature detected by said majority of said thermocouples is at or below a predefined low level temperature.

33. The handheld portable monitor as defined in claim 32, wherein said handheld portable monitor includes a RFID detection system or a barcode scanning system.

34. A handheld portable monitor configured for periodic well field testing to enable a user to test a plurality of different landfill wells one at a time and configured for measuring a plurality of properties of fluid flowing in each of the tested landfill wells, said handheld portable monitor configured to enable the user to easily and conveniently carry said handheld portable monitor to a testing site of the landfill well to be tested, said handheld portable monitor having a total weight of less than 20 pounds and a total volume of less than 500 cubic inches, said handheld portable monitor including a plurality of connectors that enable at least a portion of said handheld portable monitor to be removably connected to the landfill well to be tested and then disconnected from the tested landfill well and then later connected to another landfill well to be tested, said handheld portable monitor including a sensor arrangement to obtain and to measure said plurality of properties of said fluid flowing in the tested landfill well, said sensor arrangement including at least one pressure sensor and at least one chemical analyzer, said plurality of properties of said fluid flowing in the tested landfill well to be measured including two or more properties selected from the group consisting of well pressure, well temperature, LEL, UEL, well fluid composition, and composition ratio, said handheld portable monitor includes G.P.S. software and hardware for obtaining G.P.S. coordinates for the landfill well to be tested or that has been tested, said handheld portable monitor includes wireless technology to enable said handheld portable monitor to communicate with one or more systems selected from the group consisting of the internet, a mobile phone system, a network computer, a tablet computer, a laptop computer, a desktop computer, and a PDA, said handheld portable monitor includes a processor that processes information to generate one or more results from the processed information, a microprocessor of said sensor arrangement in said handheld portable monitor configured to receive information and is configured to process such information and to generate one or more types of information that is selected from the group consisting of said LEL of fluid, said UEL of fluid, said concentration ratio of methane to carbon dioxide, said concentration ratio of balance gas to oxygen, and a LEL value for one or more components in said landfill gas.

35. The handheld portable monitor as defined in claim 34, wherein said handheld portable monitor consists only of two separate units selected from the group consisting of a handheld portable control unit and a handheld portable measuring unit, said handheld portable control unit monitors and controls one or more functions of said handheld portable measuring unit, said handheld portable measuring unit configured to be removably connected to the tested landfill well, said handheld portable control unit configured to be physically disconnected from the landfill well during testing of the landfill well, said handheld portable measuring unit including a measuring unit housing, said measuring unit housing at least partially containing said at least one pressure sensor and said at least one chemical analyzer, said measuring unit housing including said plurality of connectors, said handheld portable control unit is a tablet PC, a palm PC, a PDA, or a smartphone device, said handheld portable measuring unit having a size, shape and weight that enables the user to easily and conveniently carry said handheld portable measuring unit to the tested landfill well, said handheld portable measuring unit having a weight of less than 10 pounds and has a volume of less than 300 cubic inches, said handheld portable control unit having a weight of less than 5 pounds and a volume of less than 100 cubic inches.

36. The handheld portable monitor as defined in claim 35, wherein said sensor arrangement in said handheld portable monitor includes one or more components selected from the group consisting of a plurality of said pressure sensors and a plurality of said chemical analyzers, said sensor arrangement including a controller arrangement, each of said pressure sensors is configured to measure a different pressure, said controller arrangement used to control each of said pressure sensors to enable said handheld portable monitor to simultaneously measure different fluid pressures from the tested landfill well, each of said chemical analyzers configured to measure a concentration of a component in said fluid from the tested landfill well such that at least two different concentrations of said components in said fluid are measured, said chemical analyzers configured to measure a concentration of methane, carbon dioxide and oxygen in said fluid from the tested landfill well, said pressures including an applied vacuum on the tested landfill well, a differential vacuum on the tested landfill well, and an available vacuum.

37. The handheld portable monitor as defined in claim 36, wherein said handheld portable measuring unit includes a heating system to heat one or more components of said sensor arrangement of said handheld portable measuring unit, said heating system including a microprocessor, a thermocouple and a heating element, said microprocessor activating said heating element when said microprocessor obtains information from said thermocouple that a temperature detected by said thermocouple is at or below a predefined low level temperature.

38. The handheld portable monitor as defined in claim 35, wherein said handheld portable control unit includes a display screen and a plurality of button positioned under said display screen.

39. The handheld portable monitor as defined in claim 35, wherein said sensor arrangement in said handheld portable monitor includes three of said pressure sensors, said controller arrangement used to control each of said pressure sensors to enable said handheld portable monitor to simultaneously measure three different fluid pressures from the tested landfill well.

40. The handheld portable monitor as defined in claim 36, wherein said sensor arrangement in said handheld portable monitor includes of said three pressure sensors, said controller arrangement used to control each of said pressure sensors to enable said handheld portable monitor to simultaneously measure three different fluid pressures from the tested landfill well.

41. The handheld portable monitor as defined in claim 39, wherein said sensor arrangement in said handheld portable monitor includes three of said chemical analyzers, each of said chemical analyzers configured to measure a concentration of a component in said fluid from the tested landfill well such that at least three different concentrations of said components in said fluid are measured.

42. The handheld portable monitor as defined in claim 40, wherein said sensor arrangement in said handheld portable monitor includes three of said chemical analyzers, each of said chemical analyzers configured to measure a concentration of a component in said fluid from the tested landfill well such that at least three different concentrations of said components in said fluid are measured.

43. The handheld portable monitor as defined in claim 34, wherein said handheld portable measuring unit includes a processor that processes information to generate a plurality of results from the processed information, said results are selected from the group consisting of LEL of fluid, UEL of fluid, concentration ratio of methane to carbon dioxide, and concentration ratio of balance gas to oxygen, a microprocessor of said sensor arrangement in said handheld portable measuring unit configured to receive information and is configured to process such information and to generate a plurality of information, said plurality of information includes information that is selected from the group consisting of said LEL of fluid, said UEL of fluid, said concentration ratio of methane to carbon dioxide, said concentration ratio of balance gas to oxygen, and a LEL value for one or more components in said landfill gas.

44. The handheld portable monitor as defined in claim 35, wherein said handheld portable measuring unit includes a processor that processes information to generate a plurality of results from the processed information, said results are selected from the group consisting of LEL of fluid, UEL of fluid, concentration ratio of methane to carbon dioxide, and concentration ratio of balance gas to oxygen, a microprocessor of said sensor arrangement in said handheld portable measuring unit configured to receive information and is configured to process such information and to generate a plurality of information, said plurality of information includes information that is selected from the group consisting of said LEL of fluid, said UEL of fluid, said concentration ratio of methane to carbon dioxide, said concentration ratio of balance gas to oxygen, and a LEL value for one or more components in said landfill gas.

45. The handheld portable monitor as defined in claim 36, wherein said handheld portable measuring unit includes a processor that processes information to generate a plurality of results from the processed information, said results are selected from the group consisting of LEL of fluid, UEL of fluid, concentration ratio of methane to carbon dioxide, and concentration ratio of balance gas to oxygen, a microprocessor of said sensor arrangement in said handheld portable measuring unit configured to receive information and is configured to process such information and to generate a plurality of information, said plurality of information includes information that is selected from the group consisting of said LEL of fluid, said UEL of fluid, said concentration ratio of methane to carbon dioxide, said concentration ratio of balance gas to oxygen, and a LEL value for one or more components in said landfill gas.

46. The handheld portable monitor as defined in claim 34, wherein said handheld portable monitor includes a RFID detection system or a barcode scanning system.

47. The handheld portable monitor as defined in claim 35, wherein said handheld portable monitor includes a RFID detection system or a barcode scanning system.

48. The handheld portable monitor as defined in claim 36, wherein said handheld portable monitor includes a RFID detection system or a barcode scanning system.

49. The handheld portable monitor as defined in claim 34, wherein said handheld portable control unit includes a display screen and a plurality of buttons positioned under said display screen.

50. The handheld portable monitor as defined in claim 36, wherein said handheld portable control unit includes a display screen and a plurality of buttons positioned under said display screen.

51. A handheld portable monitor designed for periodic well field testing to enable a user to test a plurality of different landfill wells one at a time and for measuring a plurality of properties of fluid flowing in each of the tested landfill wells, said handheld portable monitor including a plurality of connectors that enable at least a portion of said handheld portable monitor to be removably connected to the landfill well to be tested and then disconnected from the tested landfill well and then later connected to another landfill well to be tested, said handheld portable monitor including a sensor arrangement to obtain and to measure said plurality of properties of said fluid flowing in the tested landfill well, said sensor arrangement including at least one pressure sensor and at least one chemical analyzer, said handheld portable monitor including a heating system to heat at least one component of said sensor arrangement of said handheld portable monitor selected from the group consisting of said at least one pressure sensor and said at least one chemical analyzer, said plurality of properties of said fluid flowing in the tested landfill well to be measured including two or more properties selected from the group consisting of well pressure, well temperature, LEL, UEL, well fluid composition, and composition ratio, said heating system including a microprocessor, a thermocouple and a heating element, said microprocessor activating said heating element when said microprocessor obtains information from said thermocouple that a temperature detected by said thermocouple is at or below a predefined low level temperature, said sensor arrangement in said handheld portable monitor includes a controller arrangement, three pressure sensors and three chemical analyzers, and each of said pressure sensors is designed to measure a different pressure, said controller arrangement used to control each of said pressure sensors to enable said handheld portable monitor to simultaneously measure three different fluid pressures from the tested landfill well, each of said chemical analyzers designed to measure a concentration of a component in said fluid from the tested landfill well, said chemical analyzers designed to measure a concentration of methane, carbon dioxide and oxygen in said fluid from the tested landfill well, said pressures including an applied vacuum on the tested landfill well, a differential vacuum on the tested landfill well, and an available vacuum.

* * * * *